(12) United States Patent
Carlini et al.

(10) Patent No.: US 8,461,351 B2
(45) Date of Patent: *Jun. 11, 2013

(54) STERICALLY BULKY STABILIZERS

(75) Inventors: Rina Carlini, Oakville (CA); Darren Andrew Makeiff, St. Alberta (CA)

(73) Assignees: Xerox Corporation, Norwalk, CT (US); National Research Council of Canada, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,326

(22) Filed: Jul. 28, 2011

(65) Prior Publication Data

US 2011/0303122 A1 Dec. 15, 2011

Related U.S. Application Data

(63) Continuation of application No. 12/853,536, filed on Aug. 10, 2010, now Pat. No. 8,025,723, which is a continuation-in-part of application No. 12/581,488, filed on Oct. 19, 2009, now Pat. No. 7,938,903, which is a continuation-in-part of application No. 12/509,161, filed on Jul. 24, 2009, now Pat. No. 7,883,574, which is a continuation-in-part of application No. 12/405,079, filed on Mar. 16, 2009, now abandoned, which is a continuation of application No. 12/044,613, filed on Mar. 7, 2008, now Pat. No. 7,503,973.

(51) Int. Cl.
C07D 235/26 (2006.01)
C07D 235/00 (2006.01)
C07D 403/00 (2006.01)

(52) U.S. Cl.
USPC ..... 548/306.4; 106/498; 106/499; 548/304.4; 548/304.7; 548/305.1; 548/305.4; 548/305.7; 548/306.1; 548/309.1; 548/309.7; 548/310.1

(58) Field of Classification Search
USPC .................. 106/496, 498, 499; 977/773, 775, 977/788; 548/306.4, 304.4, 304.7, 305.1, 548/305.4, 305.7, 306.1, 309.1, 309.7, 310.1
See application file for complete search history.

(56) References Cited

U.S. PATENT DOCUMENTS

| | | |
|---|---|---|
| 4,073,775 A | 2/1978 | Matsuo et al. |
| 4,138,568 A | 2/1979 | Hari et al. |
| 4,830,671 A | 5/1989 | Frihart et al. |
| 4,889,560 A | 12/1989 | Jaeger et al. |
| 4,889,761 A | 12/1989 | Titterington et al. |
| 5,194,638 A | 3/1993 | Frihart et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,364,729 A | 11/1994 | Kmiecik-Lawrynowicz et al. |
| 5,370,963 A | 12/1994 | Patel et al. |
| 5,372,852 A | 12/1994 | Titterington et al. |
| 5,403,693 A | 4/1995 | Patel et al. |
| 5,418,108 A | 5/1995 | Kmiecik-Lawrynowicz et al. |
| 5,597,856 A | 1/1997 | Yu et al. |
| 5,679,138 A | 10/1997 | Bishop et al. |
| 6,174,937 B1 | 1/2001 | Banning et al. |
| 6,706,864 B1 | 3/2004 | Vincent et al. |
| 7,160,380 B2 | 1/2007 | Maeta et al. |
| 7,312,011 B2 | 12/2007 | Patel et al. |
| 7,335,453 B2 | 2/2008 | Sacripante et al. |
| 7,358,022 B2 | 4/2008 | Farrugia et al. |
| 7,371,870 B2 | 5/2008 | Hosaka et al. |
| 7,402,371 B2 | 7/2008 | Sacripante et al. |
| 7,419,753 B2 | 9/2008 | Vanbesien et al. |
| 7,425,398 B2 | 9/2008 | Nosella et al. |
| 7,429,443 B2 | 9/2008 | Patel |
| 7,442,740 B2 | 10/2008 | Patel et al. |
| 7,503,973 B1 | 3/2009 | Carlini |
| 7,524,599 B2 | 4/2009 | Vanbesien et al. |
| 7,547,499 B2 | 6/2009 | Veregin et al. |
| 7,857,901 B2 | 12/2010 | Carlini et al. |
| 7,883,574 B2 * | 2/2011 | Carlini et al. .................. 106/496 |
| 7,905,954 B2 | 3/2011 | Carlini et al. |
| 7,938,903 B2 * | 5/2011 | Carlini et al. .................. 106/496 |
| 7,985,290 B2 | 7/2011 | Carlini et al. |
| 8,025,723 B2 * | 9/2011 | Carlini et al. .............. 106/31.65 |
| 8,362,270 B2 * | 1/2013 | Makeiff et al. ............ 548/306.4 |
| 2005/0048121 A1 | 3/2005 | East et al. |
| 2005/0109240 A1 | 5/2005 | Maeta et al. |
| 2005/0176726 A1 | 8/2005 | Wang et al. |
| 2006/0063873 A1 | 3/2006 | Lin et al. |
| 2006/0084732 A1 | 4/2006 | Shakely et al. |
| 2007/0012221 A1 | 1/2007 | Maeta et al. |
| 2008/0306193 A1 | 12/2008 | Allen et al. |

FOREIGN PATENT DOCUMENTS

| | | |
|---|---|---|
| GB | 2 238 792 | 6/1991 |
| JP | 2003081948 A * | 3/2003 |

(Continued)

OTHER PUBLICATIONS

CAS Accession No. 2006:889233 (Document No. 145:272901), Harashina, "Polyacetal Compositions for Prevention of Formaldehyde Release and Their Moldings", JP 2006225550 (Aug. 2006).*

(Continued)

*Primary Examiner* — Anthony J Green
(74) *Attorney, Agent, or Firm* — Oliff & Berridge, PLC

(57) ABSTRACT

A sterically bulky stabilizer that includes an alkylated-benzimidazolone compound, where the sterically bulky stabilizer is associated non-covalently with a benzimidazolone pigment, and the presence of the sterically bulky stabilizer limits the extent of particle growth and aggregation, to afford nanoscale pigment particles.

3 Claims, No Drawings

FOREIGN PATENT DOCUMENTS

| JP | A-2003-082256 | 3/2003 |
| JP | A-2003-096056 | 4/2003 |
| JP | 2003252864 A * | 9/2003 |
| JP | A 2009-221266 | 10/2009 |
| WO | WO 2006/005536 | 1/2006 |
| WO | WO 2006/132443 | 12/2006 |

OTHER PUBLICATIONS

CAS Accession No. 1997:118989 (Document No. 126:137662), Oota, Manufacture of Electrostatic Charge Image Develop\ment Toners by Suspension Polymerization With Uniform Size Distribution JP08305084 (Nov. 1996).*
CAS Accession No. 2005:1259726 (Document No. 144:6578), Snow et al, "Substituted N-Aryl Benzamides and Related Compounds for Treatment of Amyloid Diseases and Synucleinopathies, Their Preparation and Pharmaceutical Compostions", WO2005113489 (Dec. 2005).*
CAS Accession No. 2006:597708 (Document No. 145:64647), Tsujimura et al, "Ink Sets With Good Bleeding Resistance, Ink-Jet Recording Method Using Them and Recorded Materials by the Method", JP2006160815 (Jun. 2006).*
CAS Accession No. 1981:605407 (Document No. 95:605407), Pawelec et al, "Benzimadazole Azo Pigments", PL105225 (Sep. 1979).*
CAS Accession No. 1980:496794 (Document No. 93:96794), Fuchs, "Monoazo Dyes and Their Use", DE 2847285 (May 1980).*
CAS Accession No. 1979:422411 (Document No. 91:22411), Ciba Geigy, "Azo Pigments", JP 54029334 (Mar. 1979).*
CAS Accession No. 2005:346583 (Document No. 142:393811), Shakhnovichl, "Azo Pigments for Aqueous Jet-Priniting Ink Dispersion and Method for Manufacture of the Inks", US20050081749 A1 (Apr. 2005).*
Jan. 5, 2012 Office Action issued in U.S. Appl. No. 12/820,497.
Schulz et al., "Preparation and Characterization of Ordered Thin Films Based on Aromatic poly(1,3,4-oxadiazole)s," Reactive & Functional Polymers, vol. 30, pp. 353-360, 1996.
Cuppen et al., "Needlelike Morphology of Aspartame," Crystal Growth and Design, vol. 4, No. 5, pp. 989-997, 2004.
Winn et al., "A New Technique for Predicting the Shape of Solution-Grown Organic Crystals," AIChE Journal, vol. 44, No. 11, pp. 2501-2514, Nov. 1998.
Taulelle et al., "Pharmaceutical Compound Crystallization: Growth Mechanism of Needle-Like Crystals," Chem. Eng. Technol., vol. 29, No. 2, pp. 239-246, 2006.
Lee et al., "Controlling the Crystal Morphology of One-Dimensional Tunnel Structures: Induced Crystallization of Alkane/Urea Inclusion Compounds as Hexagonal Flat Plates," Chemical Physics Letters, vol. 307, pp. 327-332, 1999.
Chetina, "How to Grow Single Crystals for X-Ray Analysis by Solution Crystallisation," http:/www.dur.ac.uk/crystallography.group/imagesgroup/GrowCrystals.pdf, Durham, pp. 1-16, 2009.
E. Cole et al., "Oxidations with Lead Tetraacetate. Oxidations of Benzimidazoles, Benzoxazoles, and Benzothiazoles," *Australian J. Chem.*, 1986, vol. 39, pp. 295-301.
K. Balakrishnan et al., "Effect of Side-Chain Substituents on Self-Assembly of Perylene Diimide Molecules: Morphology Control,"*J. Am. Chem. Soc.*, vol. 128, pp. 7390-7398 (2006).
K. Hunger et al., "Uber die Molekul- und Kristallstruktur gelber Mono-"azo"-Pigmente," *Farbe + Lack*, vol. 88, pp. 453-458 (1982).
R. Clark et al., "Synthesis of Some Substituted Benzimidazolones,"*J. Am. Chem. Soc.*, Apr. 5, 1958, vol. 80, pp. 1657-1662.
Hideki Maeta et al., "New Synthetic Method of Organic Pigment Nano Particle by Micro Reactor System," http://aiche.confex.com/aiche/s06/preliminaryprogram/abstract_40072.htm (date unknown).
E.F. Paulus, "Molecular and crystal structure of C.I. Pigment Red 208, 12514, n-butyl-2-[2-oxo-3-[N-(2-oxo-2,3-dihydro-5-benzimidazoly1)-carbamoyl]-naphthylidenhydrazino]-benzoat (PV-Rot IIF2B),"; Zeitschrift fur *Kristallographie*, vol. 160, pp. 235-243 (1982).

J. van de Streek, et al., "Structures of six industrial benzimidazolone pigments from laboratory powder diffraction data," Acta Crystallographica Section B, Structural Science, 2009, vol. B65, pp. 200-211.
U.S. Appl. No. 12/405,079, filed Mar. 16, 2009.
U.S. Appl. No. 12/509,161, filed Jul. 24, 2009.
U.S. Appl. No. 12/581,510, filed Oct. 19, 2009.
U.S. Appl. No. 12/581,420, filed Oct. 19, 2009.
U.S. Appl. No. 12/044,613, filed Mar. 7, 2008.
U.S. Appl. No. 12/581,488, filed Oct. 19, 2009.
Nov. 29, 2011 Supplemental European Search Report issued in corresponding European Application No. 10170214.0.
Feb. 23, 2012 Office Action issued in U.S. Appl. No. 13/185,058.
Mar. 9, 2012 Office Action issued in U.S. Appl. No. 13/189,887.
Feb. 16, 2012 Office Action issued in U.S. Appl. No. 12/777,329.
Apr. 24, 2012 Office Action issued in U.S. Appl. No. 12/820,497.
Mar. 22, 2012 Canadian Office Action issued in Canadian Application No. 2,717,464.
CAS Accession No. 2005:1009157 (Document No. 143:434968), Bao et al., "Behaviour of Nucleotides and Oligonucleotides in Potentiometric HPLC Detection", Analytica Chimica Acta (2005) 550(1-2), 130-136.
CAS Accession No. 2002:315164 (Document No. 136:342593), Ushio et al., WO 2002033162 A 1 (Apr. 2002).
CAS Accession No. 1950:16130 (Document No. 44:16130), Carey et al., "Relation of Chemical Constitution of A Series of Esters of Picolinic Acid to Toxicity as Insecticides", Journal of Econonic Entomology (1949), 42, 798-801.
CAS Accession No. 2004:976866 (Document No. 142:130050), Steinkamp et al., "Detection Scheme for Bioassays Based on 2,6-pyridinedicarboxylic acid Derivatives and Enzyme Amplified Lanthanide Luminescence", Analytica Chicmica Acta (2004), 526(1),27-34.
CAS Accession No. 1940:10519 (Document No. 34:10519), "Long-Chain Alkyl Derivatives of 2-aminopyridine", Journal of the Chemical Society (1939), 1855-7.
CAS Accession No. 2004:680170 (Document No. 141:197407), Sano, "Reversible Thermal Recording Material Containing Leuco Dye and Developer", JP2004230720 A (Aug. 2004).
CAS Accession No. 1980:77233 (Document No. 92:77233), Gibalewicz et al., "Study of the Electric Conductivity of Poly(vinylchloride) With Organic Additives", Polimery (Warsaw, Poland) (1979),24(9),325-9.
CAS Accession No. 1988:501769 (Document No. 109:101769), Kaneko, JP63-085548A (Apr. 1988).
CAS Accession No. 2002:77478 (Document No. 136:134986), Sato et al., Japanese Patent Specification No. JP2002-030091 A (Jan. 2002).
CAS Accession No. 1999:474880 (Document No. 131 :177582), Lee et al., "Controlling the Crystal Morphology of One-Dimensional Tunnel Structures: Induced Crystallization of Alkane/Urea Inclusion Compounds as Hexagonal Flat Plates", Chemical Physics Letters (1999), 307(5,6), 327-332.
CAS Accession No. 1995:568916 (Document No. 122:291987, Boehme et al., Journal of the American Chemical Society (1995), 117(21), 5824-8.
CAS Accession No. 1977:91891 (Document No. 86:91891), Matsuo et al., Japanese Patent Specification No. JP51-134729 (Nov. 1976).
Jun. 13, 2012 Office Action issued in U.S. Appl. No. 13/185,058.
Jun. 21, 2012 Office Action issued in U.S. Appl. No. 13/189,887.
Schwiebert et al., "Engineering the Solid State with 2-Benzimidazolones," J. Am. Chem. Soc., vol. 11, No. 17, pp. 4018-4029, May 1, 1996.
Sep. 25, 2012 Canadian Office Action issued in Canadian Patent Application No. 2,717,579.
Accession No. 1971:46197, abstract of Buehler et al., article entitled: "Metal Complexes with α,ω-bis(2-pyridyl)alkanes," Chimia (1970), 24(12), 433-436.
Accession No. 1983:129983, abstract of European Patent Application No. EP57797 (Aug. 1982).

Accession No. 2005:106034, abstract of Xie et al., article entitled: "New silver(I) coordination architectures of pyridyl dithioether ligands with Ag•••Ag, Ag•••O, Ag•••S and C-H•••F weak interactions," Polyhedron (2005), 24(3), 413-418.

Accession No. 2005:142281, abstract of Schmuch et al., article entitled: "Amino acid binding by 2-(guanidiniocarbonyl)pyridines in aqueous solvents: a comparative binding study correlating complex stability with stereoelectronic factors," Chemistry—a European Journal (2005), 11(4), 1109-1118.

Accession No. 2006:274394, abstract of Pellei et al., article entitled: "Synthesis and characterization of new organotin(IV) complexes with polyfunctional ligands," Journal of Organometallic Chemistry (2006), 691(8), 1615-1621.

Accession No. 2006:1202500, abstract of PCT International Application No. WO 2006/122156 A2 (Nov. 2006).

Accession No. 2007:488296, abstract of Yu et al., article entitled: "N1, N3-Di-2-pyridylmalonamide," Acta Crystallographica, Section E: Structure Reports Online (2007), E63(5), o2650.

Nov. 15, 2012 Office Action issued in U.S. Appl. No. 13/185,058.

* cited by examiner

STERICALLY BULKY STABILIZERS

This application is a continuation of U.S. patent application Ser. No. 12/853,536 filed Aug. 10, 2010, now U.S. Pat. No. 8,025,723, which is a continuation-in-part of U.S. patent application Ser. No. 12/581,488 filed Oct. 19, 2009, now U.S. Pat. No. 7,938,903, which is a continuation-in-part of U.S. patent application Ser. No. 12/509,161 filed Jul. 24, 2009, now U.S. Pat. No. 7,883,574, which is a continuation-in-part of U.S. patent application Ser. No. 12/405,079 filed Mar. 16, 2009, now abandoned, which is a continuation of U.S. patent application Ser. No. 12/044,613 filed Mar. 7, 2008, now U.S. Pat. No. 7,503,973. The entire disclosures of these prior applications are incorporated herein by reference.

PARTIES TO A JOINT RESEARCH AGREEMENT

This application is a result of activities undertaken within the scope of a joint research agreement between Xerox Corporation and National Research Council of Canada that was in effect on or before the date the research leading to this application was made.

TECHNICAL FIELD

This disclosure is generally directed to nanoscale pigment particles comprising benzimidazolone molecules associated with a sterically bulky stabilizer compound, wherein the sterically bulky stabilizer compound comprises an alkylated-benzimidazolone compound, and methods for producing such compounds.

BACKGROUND

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during a number of rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers can include at least one wax, for example, a crystalline wax and/or a semi-crystalline wax, and at least one amorphous resin in the ink vehicle. Such phase-change or solid inkjet inks provide vivid color images. In some embodiments, these crystalline wax-based inks partially cool on an intermediate transfer member, for example, a transfer drum or belt, and are then transferred onto the image receiving medium such as paper. This action of image transference onto a substrate such as paper spreads the image droplet, providing a richer color and lower pile height. The low flow of the solid ink also prevents show-through on the underside of the paper.

Pigments are a type of insoluble colorant that are useful in a variety of applications such as, for example, paints, plastics, xerographic toners and a variety of inks, including inkjet printing inks. Dyes are readily soluble colorants and have typically been the colorants of choice for applications such as inkjet printing inks. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photo-oxidation from light (leads to poor lightfastness), dye diffusion from the ink into paper or other substrates (leads to poor image quality and showthrough), and the ability for the dye to leach into another solvent that makes contact with the image (leads to poor water-/solvent-fastness). In certain situations, pigments have the potential to be a better alternative as colorants for inkjet printing inks since they are insoluble and cannot be molecularly dissolved within the ink matrix, and in most cases do not experience colorant diffusion or color degradation. Pigments can also be significantly less expensive than dyes, and so are attractive colorants for use in all types of printing inks.

Key challenges with using pigments for inkjet inks are their large particle sizes and wide particle size distribution, the combination of which can pose critical problems with reliable jetting of the ink, that is, inkjet nozzles are easily blocked. Pigments are rarely obtained in the form of single crystal nanoparticles, but rather as micron-sized large aggregates of crystals and often having a wide distribution of aggregate sizes. The color characteristics of the pigment can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nanoscale pigment particles that minimize or avoid the problems associated with conventional larger-sized pigment particles. There is a further need for use of such nanoscale pigment particles in non-polar phase-change (solid) ink compositions that could enable a reliable ink jetting performance and provide high-quality and robust images. There further remains a need for processes for making and using such phase change ink compositions containing the nanoscale pigment particles as colorant materials. The present nanoscale pigment particles are also useful in, for example, paints, coatings, electrophotography toners, and other applications where pigments can be used such as colorized plastics and resins, optoelectronic imaging components and optical color filters, photographic components, and cosmetics among others.

The following documents provide background information:

Hideki Maeta et al., "New Synthetic Method of Organic Pigment Nano Particle by Micro Reactor System," in an abstract available at the American Institute for Chemical Engineers' website describes a new synthetic method of an organic pigment nanoparticle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Pat. No. 7,160,380 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

U.S. Patent Application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing a non-polar liquid or solid phase change ink compositions comprising nanoscale benzimidazolone pigment particle compositions, and methods for producing such compositions.

In an embodiment, the present disclosure provides a sterically bulky stabilizer, comprising an alkylated-benzimidazolone compound, wherein the sterically bulky stabilizer is associated non-covalently with a benzimidazolone pigment, and the presence of the sterically bulky stabilizer limits an extent of particle growth and aggregation, to afford nanoscale pigment particles.

DETAILED DESCRIPTION OF EXEMPLARY EMBODIMENTS

Embodiments of the present disclosure provide ink compositions, such as nonpolar liquid or solid phase change ink compositions, comprising nanoscale benzimidazolone pigment particle. The nanoscale pigment particle compositions generally comprise an organic benzimidazolone pigment having at least one functional moiety that associates non-covalently with a functional group from a sterically bulky stabilizer compound, where the sterically bulky stabilizer compound comprises an alkylated-benzimidazolone compound. The presence of the associated sterically bulky stabilizer limits the extent of particle growth and aggregation, to afford nanoscale particles. In particular, the alkylated-benzimidazolone compounds are capable of inter- and intra-molecular hydrogen bonding, to limit particle growth and aggregation.

Benzimidazolone pigments in this disclosure are of the azo-benzimidazolone class of organic pigments, which are generally derived from a substituted aromatic amine as the diazonium salt precursor (or, diazo component) and a coupling agent that contains a benzimidazolone functional moiety. Azo-benzimidazolone pigments are known to provide colors with hues ranging from yellow to red to brownish-red, depending primarily upon the chemical composition of the coupling component.

The structure of azo-benzimidazolone pigments disclosed herein can be represented with the general structure in Formula 1, comprised of a diazo component denoted as group $G_{DC}$, and a nucleophilic coupling component group which is denoted as group $G_{CC}$, where these two groups are linked together with an azo functional moiety group (N=N). Either or both of the diazo and coupling groups can contain within their structures the benzimidazolone functional moiety shown in Formula 2, wherein the substituents $R_x$, $R_y$, and $R_z$ are most typically hydrogen, halogen, alkoxyl groups, but can also include small aliphatic groups of less than 6 carbon atoms, small arene or heterocyclic arene groups of less than 10 carbon atoms, or derivatives of carbonyl compounds such as aldehydes, ketones, ester, acids, anhydrides, urethanes, ureas, thiol esters, thioesters, xanthates, isocyanates, thiocyanates, or any combination of these substituents.

Formula 1

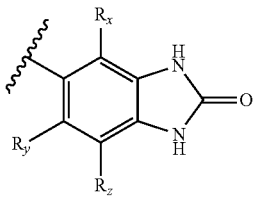

Formula 2

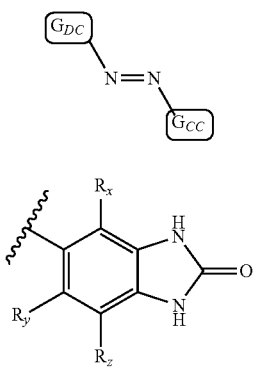

The diazo group $G_{DC}$ can be derived from a variety of substituted aniline or napthylamine compounds, and while they can have many possible structures, the pigment compositions of this disclosure include the general diazo group compositions $DC_1$ to $DC_7$ shown below:

DC$_1$

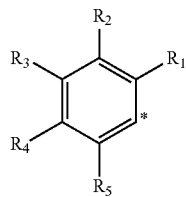

DC$_2$

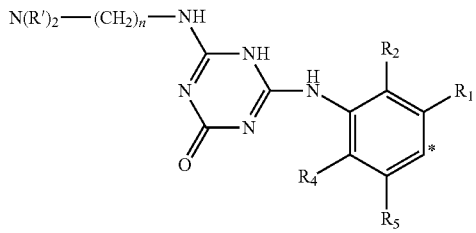

DC$_3$

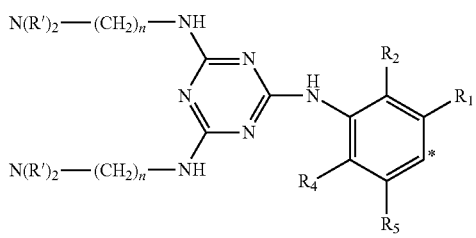

DC$_4$

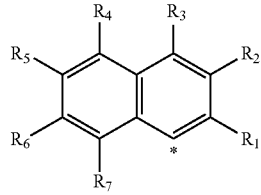

DC$_5$

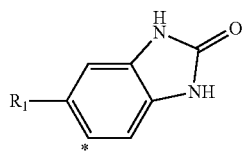

DC$_6$

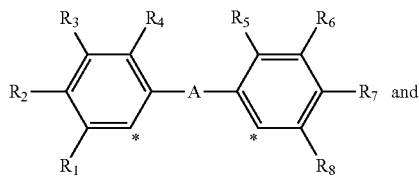

DC$_7$

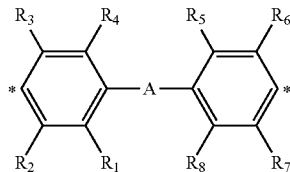

In such structures, the asterisk (*) indicates the point of attachment to the amino group (—NH$_2$) in the pigment precursor structure, and also the point of attachment to the azo functional moiety (—N=N—) in the final pigment structure. $R_1$ to $R_7$ independently represent H; halogens such as F, Cl, Br, I; (CH$_2$)$_n$CH$_3$ where n=0-6; OH; alkoxyl groups —OR' where R' represents H, (CH$_2$)$_n$CH$_3$, or C$_6$H$_5$, and n represents a number of from 1 to about 6; CO$_2$H; CO$_2$CH$_3$; CO$_2$(CH$_2$)$_n$CH$_3$ wherein n=0-5; CONH$_2$; (CO)R' wherein R' can independently represent H, C$_6$H$_5$, (CH$_2$)$_n$CH$_3$ wherein n=0-12, or they can represent (CH$_2$)$_n$N(CH$_3$)$_2$ wherein n=1-6; OCH$_3$; OCH$_2$CH$_2$OH; NO$_2$; SO$_3$H; or any of the following structural groups:

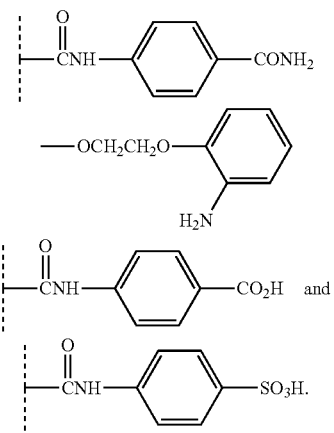

In $DC_2$ and $DC_3$ R' represents H, $CH_3$, $(CH_2)_nCH_3$, or $C_6H_5$, and n represents a number from 1 to 6. In some instances, the diazo group precursor can be a substituted aniline compound that possesses the benzimidazolone functional moiety of Formula 2, as for example in the structure of $DC_5$. In the dimeric diazo precursors $DC_6$ and $DC_7$, the linking group A can represent —$(CH_2)_n$— where n=0-6; alkylenedioxy groups —[O—$(CH_2)_n$—O]— where n=0-6, and —[O—$CH_2$ $CHR)_n$]— where n=0-6 and R=H or $CH_3$; —(C=O)—; atoms such as O, S; acyl groups such as —$(CH_2)_n$— (C=O)— where n=1-6; diacyl groups such as —(C=O)— $(CH_2)_n$—(C=O)— where n=1-6, and the like.

It is the coupling component group ($G_{CC}$) which typically contains the benzimidazolone functional group (Formula 2), and is generally an amide of 5-aminobenzimidazolone. There are two common classes of amides used as the coupling component when making azo-benzimidazolone pigments, acetoacetamides of 5-aminobenzimidazolones (denoted as CC 1) and 3-hydroxy-2-naphthamides of 5-aminobenzimidazolones (denoted as CC 2):

in the pigment structure, and $R_9$, $R_{10}$, $R_{11}$, $R_{12}$, and $R_{13}$ are independently H, Br, Cl, I, F, $CH_3$, or $OCH_3$. It is known that the structure of the coupling component for these pigments will determine the range of colors produced by the pigment. For instance, azo-benzimidazolone pigments produced with coupling components that have general structure CC 1 will exhibit yellow to orange hues, whereas use of coupling components having the general structure CC 2 will exhibit red to brown (or maroon) hues.

As with many azo class colorants that produce yellow or red or brown hues, the structure of the azo-benzimidazolone pigments can adopt more than one tautomeric form due to the presence of strong intra-molecular hydrogen bonding between the N atoms of the azo group and the H atom of a nearby heteroatom substituent on the coupling component group $G_{CC}$. For example, the composition of Pigment Red 208 (Color Index No. 12514) shown in Formula 3 depicts the extensive intra-molecular hydrogen bonding with the hashed bond lines in both the "azo" tautomer (3a) and the "hydrazone" tautomer (3b). It is also understood that the general structure in Formula (1) is understood to denote both such tautomeric structural forms.

Formula 3

Pigment Red 208 (C.I. No. 12514)

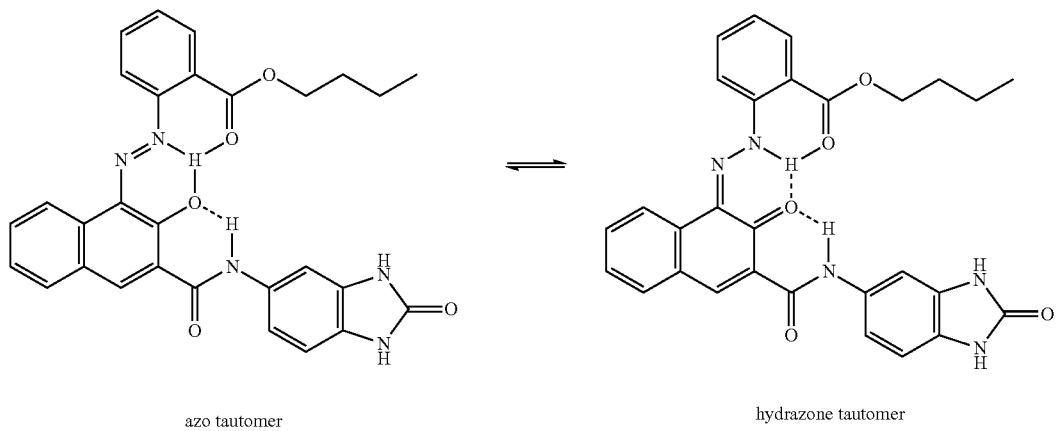

azo tautomer        hydrazone tautomer

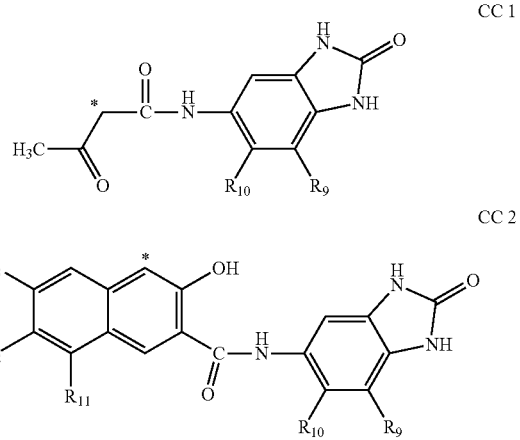

CC 1

CC 2

In such structures, the asterisk (*) indicates the point of attachment to the azo functional moiety (—N=N—) formed In addition to intra-molecular hydrogen bonding, it is also known that azo-benzimidazolone pigments are capable of forming one-dimensional, extended network structures due to strong inter-molecular hydrogen bonding. Evidence has been found in the X-ray diffraction patterns of such pigments, where the large intermolecular spacings have suggested that pairs of pigment molecules associate strongly together via inter-molecular H bonds to form a microstructural assembly of one-dimensional bands or ribbons. As examples, see the published crystal structures for various azo-benzimidazolone pairs reported in 1) K. Hunger, E. F. Paulus, D. Weber; *Farbe+ Lack*; (1982), 88, 453, 2) E. F. Paulus; *Kristallogr.* (1982), 160, 235, and more recently in 3) J. van de Streek, et al. in *Acta Cryst.* (2009). B65, 200, the entire disclosures of which are incorporated herein by reference. For the latter reference 3) the authors have provided modeled crystal structures based on the actual X-ray diffraction data which illustrate the intermolecularly hydrogen-bonded network, such as for example Pigment Yellow 151, in Formula 4.

Formula 4

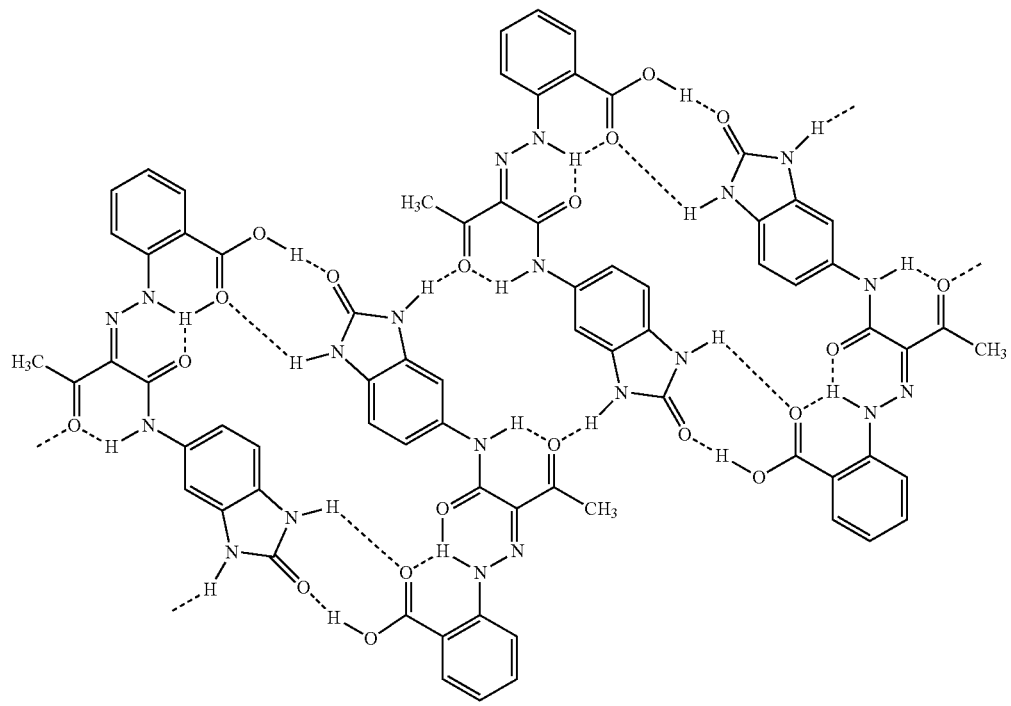

Furthermore, the existence of these reinforcing intra- and inter-molecular hydrogen bonds provide further proof for the enhanced performance properties of azo-benzimidazolone pigments, such as high thermal stability, high lightfastness, high color-migration resistance and high solvent fastness. The benzimidazolone functional moiety in these pigments is a key structural element that enables the formation of inter-molecular hydrogen bonds, and helps to provide the enhanced robustness properties. Given the propensity of this moiety to readily partake in single-point and double-point hydrogen bonding, it is conceivable that another compound having either the same or different functional moiety, is capable of associating non-covalently, such as through inter-molecular hydrogen bonds, with azo-benzimidazolone pigments and will therefore have a high binding affinity for such pigments. Such compounds are included in a group of compounds which herein are referred to as "stabilizers", which function to reduce the surface tension of the pigment particle and neutralize attractive forces between two or more pigment particles or structures, thereby stabilizing the chemical and physical structure of the pigment. In addition to these compounds having a "pigment-affinic" functional moiety, they also possess one or more hydrophobic groups, such as long alkyl hydrocarbon groups, or alkyl-aryl hydrocarbon groups, or polymeric and/or oligomeric chains with alkyleneoxy groups, wherein the alkyl groups can be linear, cyclic or branched in structure and have at least 6 or more carbons in total. The presence of the additional hydrophobic groups in such stabilizers can serve several functions: (1) to compatibilize the pigment for better dispersability in the targeted vehicle or matrix; and (2) to provide a sterically bulky layer surrounding the pigment particle, thereby preventing or limiting the approach of other pigment particles or molecules that results in uncontrolled crystal aggregation, and ultimately particle growth. Compounds having both a pigment-affinic functional moiety that associates noncovalently with the pigment, as well as one or more sterically bulky hydrocarbon groups that provide a surface barrier to other pigment particles, are referred to as "steric stabilizers" and have been used in various ways to alter the surface characteristics of conventional pigments and other particles requiring stabilization (for example, latex particles in paints, metal oxide nanoparticles in robust coatings, among others).

The term "precursor" as used in "precursor to the benzimidazolone pigment" can be any chemical substance that is an advanced intermediate in the total synthesis of a compound (such as the benzimidazolone pigment). In embodiments, the precursor to the azo-benzimidazolone pigment may or may not be a colored compound. In embodiments, where the azo-benzimidazolone pigment and the precursor have a structural moiety or characteristic in common, the phrase "benzimidazolone pigment/pigment precursor" is used for convenience rather than repeating the same discussion for each of the pigment and the pigment precursor.

The benzimidazolone pigment/precursor in embodiments can form one or more hydrogen bonds with selected stabilizer compounds, per benzimidazolone unit or molecule. For example, in embodiments, the benzimidazolone pigment/precursor can form one, two, three, four, or more hydrogen bonds with selected stabilizer compounds, per benzimidazolone. Thus, for example in the benzimidazolone functional moiety of Formula 2, a hydrogen atom from the —NH group and/or an oxygen atom in the carbonyl (C=O) group can form hydrogen bonds with complementary oxygen, nitrogen and/or hydrogen atoms located on selected stabilizer compounds. In the same way, the hydrogen atoms from the —NH group in the benzimidazolone moiety can form one or more distinct hydrogen bonds with complementary oxygen or nitrogen atoms found on the stabilizer functional groups. Of course, other combinations are also possible and encompassed herein.

The stabilizer can be any compound that has the function of limiting the self-assembly of colorant molecules during pigment synthesis, and/or limiting the extent of aggregation of primary pigment particles, so as to produce predominantly nanoscale pigment particles. The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is hydrogen bonded to the pigment/precursor surface, occupies a 3-dimensional spatial volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the pigment/pigment precursor (for example, by hydrogen bonding, van der Waals forces, aromatic pi-pi interactions, or other), the stabilizer molecules act as surface agents for the primary pigment particles that effectively shields them, thereby limiting the growth of the pigment particles and affording predominantly nanoparticles of the pigment. As examples, for azo-benzimidazolone pigments Pigment Red 175 and Pigment Yellow 151, the following hydrocarbon moieties on the stabilizers are considered to have adequate "steric bulk" so as to enable the stabilizer to limit the extent of pigment self-assembly or aggregation and mainly produce pigment nanoscale particles:

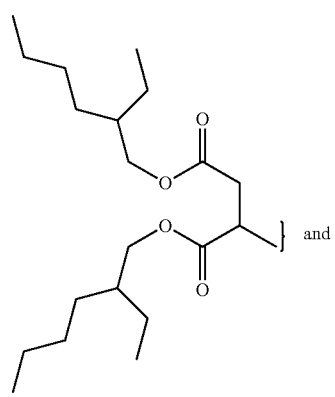 and

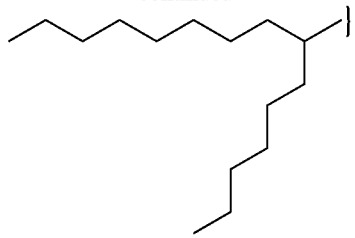

Suitable stabilizer compounds are preferably those that are amphiphilic; that is, they have a hydrophilic or a polar functional group with available heteroatoms for hydrogen bonding with the pigment/pigment precursor, as well as a non-polar or hydrophobic sterically bulky group that has at least 6 carbons and not more than 100 carbons and is predominantly aliphatic (or fully saturated) but can include some ethylenically unsaturated groups and/or aryl groups. Classes of suitable stabilizer compounds include the following core compounds that are substituted with mono- and dicarboxylic acids, mono- and diesters, and mono- and/or diamide derivatives: benzoic acid, phthalic acid or anhydride, isophthalic acid, trimesic acid, trimellitic acid or anhydride, pyridine, piperidine, piperazine, morpholine and pyrroles; monoalkyl pyridine, piperazine, piperidine, morpholine, pyrrole, imidazole, benzimidazole and benzimidazolones, thiazole, thiazoline, and thiazolone, and their cationic salts, wherein the alkyl substituent is a long-chain aliphatic hydrocarbon or branched aliphatic hydrocarbon such as the long-branched "Guerbet-type" hydrocarbon; poly(vinyl pyrrolidone) and copolymers of poly(vinyl pyrrolidone) with α-olefins or other ethylenically unsaturated monomer compounds, such as for example poly(vinyl pyrrolidone-graft-1-hexadecane) and poly(vinyl pyrrolidone-co-eicosene) and the like; poly(vinyl imidazole) and copolymers of poly(vinyl imidazole) with α-olefins or other ethylenically unsaturated monomer compounds; poly(vinyl pyridine) and copolymers of poly(vinyl pyridine) with α-olefins or styrene, or other ethylenically unsaturated monomer compounds; long-chain or branched aliphatic primary amides and amidines, including primary amides and amidines with branched alkyl groups; semicarbazides and hydrazones of long, linear and/or branched aliphatic aldehydes and ketones; mono-substituted ureas and N-alkyl-N-methyl ureas, wherein the substituent is a long, linear and/or branched aliphatic hydrocarbon; monosubstituted monosubstituted guanidines and guanidinium salts, wherein the substituent is a long, linear and/or branched aliphatic hydrocarbon; mono- and di-substituted succinimides, such as 2-alkyl- and 2,3-dialkyl-succinimides, and mono- and di-substituted succinic acids or their esters, wherein one or more alkyl substituent is comprised of a long, linear and/or branched aliphatic hydrocarbon having between 6 and 100 carbon atoms; mixtures thereof; and the like.

Representative examples of such suitable stabilizer compounds include (but are not limited to) the following compounds:

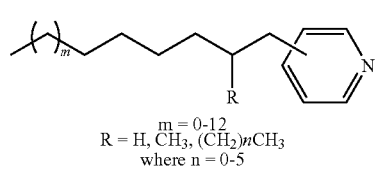

m = 0-12
R = H, CH$_3$, (CH$_2$)$_n$CH$_3$
where n = 0-5

13
-continued

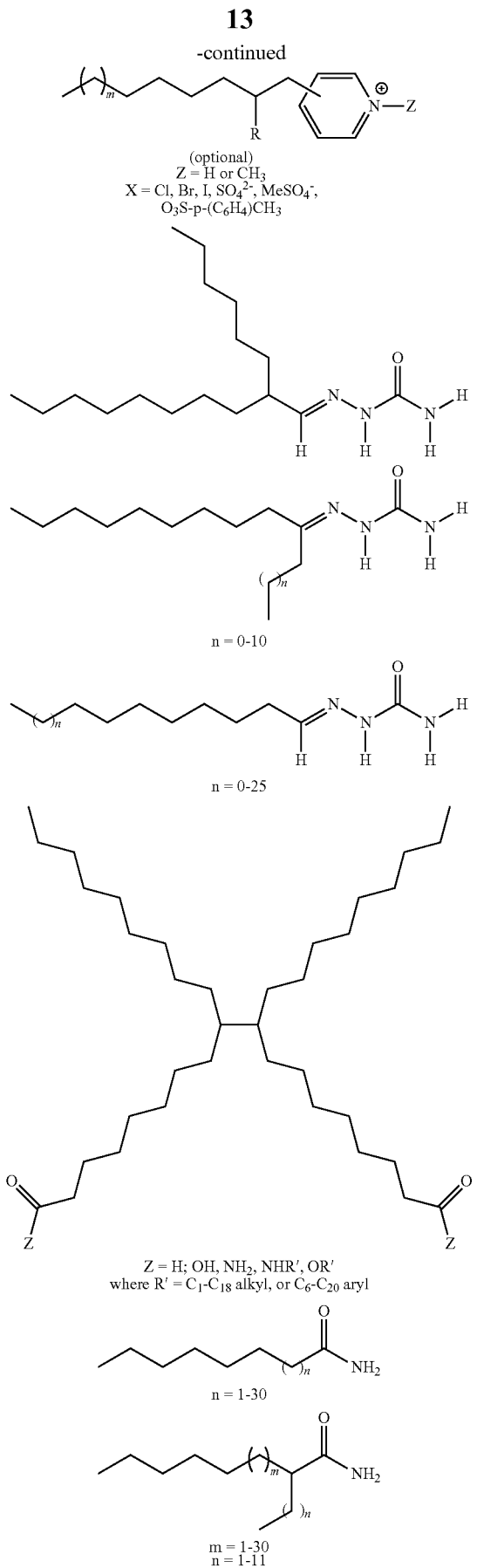

14
-continued

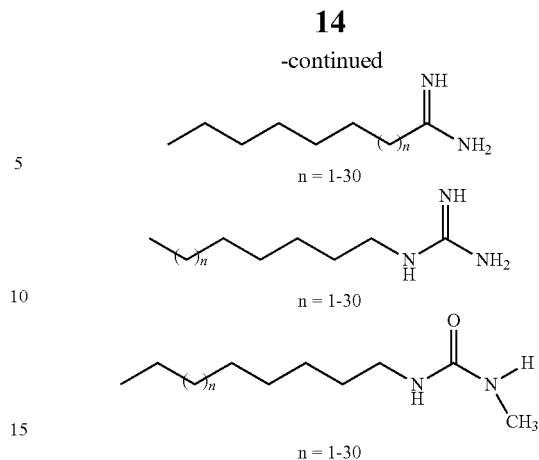

Another class of useful sterically bulky stabilizer compounds that can be advantageously used in embodiments are alkylated-benzimidazolone compounds. Representative examples of suitable alkylated benzimidazolone compounds include (but are not limited to) compounds of the following general Formula:

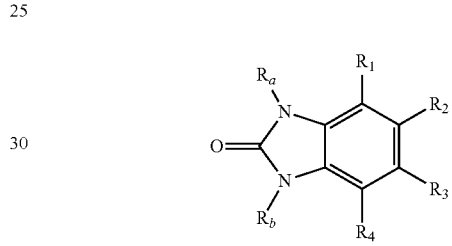

wherein $R_a$ and $R_b$ independently represent H or substituted or unsubstituted alkyl groups, provided that at least one of $R_1$, $R_2$, $R_3$, and $R_4$ is X—$R_c$, where X represents a linking group, and $R_c$ represents a substituted or unsubstituted alkyl group, provided that at least one of $R_a$ and $R_b$ represents H. The remaining groups $R_1$, $R_2$, $R_3$, and $R_4$ that are not X—$R_c$ may be the same or may be different and are not particularly limited, and can represent H or substituted or unsubstituted organic groups, such as H, a substituted or unsubstituted alkyl group, a substituted or unsubstituted aryl group, a substituted or unsubstituted aryl-alkyl group, a substituted or unsubstituted alkyl-aryl group, or the like, where the substitutions can be, for example, hydrocarbon groups, substituted hydrocarbon groups, heteroatoms, halogens, or the like. In one embodiment, at least $R_2$ represents X—Rc. In another embodiment, when $R_a$, $R_b$, $R_1$, $R_3$ and $R_4$ all represent H, and $R_2$ represents X—$R_c$ where X represents —NH—, then $R_c$ represents a substituted or unsubstituted alkyl group, such as a group other than an acylaceto group such as an acetoacetyl group.

The linking group X can be any suitable functional group that connects the substituted or unsubstituted alkyl group to the benzimidazolone moiety. Examples of suitable linking groups include —O—, —NH—, —S—, amide groups (—NH—(C=O)—) and (—(C=O)—NH—), amine groups (—NH—), urea groups (—NH—(C=O)—NH—), carbamate or urethane groups (—NH—(C=O)—O—) and (O—(C=O)—NH—), carbonate groups, and ester groups (—(C=O)—O—) or (—O—(C=O)—). In cases where the linking group X is the moiety (—NH—) or is O or S, then group $R_3$ can additionally represent groups of the formula,

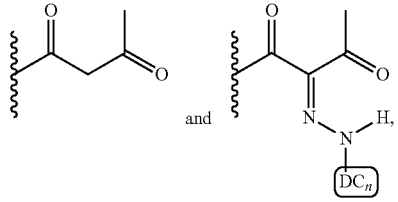

and groups of the formula,

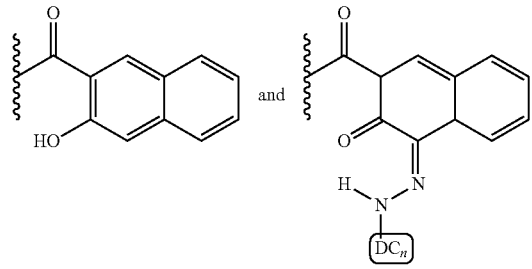

wherein the symbol DCn is a diazo moiety, such as the diazo moieties $DC_n$ in the above formulae refers to the labels 1-7 (as in $DC_1$, $DC_2$, ... $DC_7$) described previously.

The groups $R_a$, $R_b$, and/or $R_c$ can be any suitable alkyl group that can provide a sterically bulky layer when the compounds are structurally aggregated, thereby preventing or limiting the approach of other particles or molecules that leads to uncontrolled aggregation and particle growth. Examples of suitable sterically bulky groups include the various non-polar or hydrophobic sterically bulky groups described previously. Specific examples of the sterically bulky alkyl groups include straight or branched alkyl groups of 1 to 100, such as 1 to 50 or 6 to 30 carbon atoms, and including large linear, branched and/or cyclic aliphatic groups like those of the general formulae:

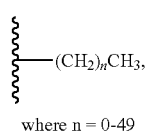

where n = 0-49

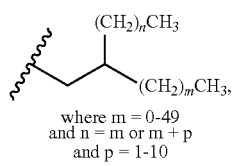

where m = 0-49
and n = m or m + p
and p = 1-10

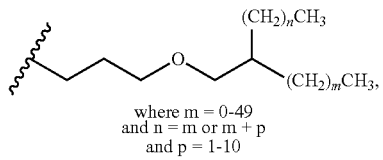

where m = 0-49
and n = m or m + p
and p = 1-10

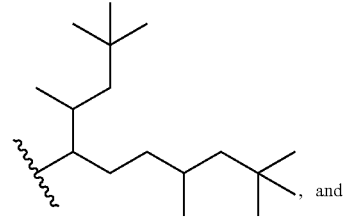

, and

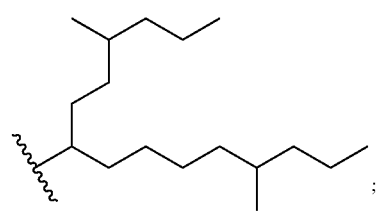

;

and also includes substituted straight or branched alkyl groups of 1 to 50, such as 1 to 40 or 6 to 30 carbon atoms, including those of the formula —CO—$(CH_2)_n$—$CH_3$, where n is from 0 to 30; and the like. Other useful $R_c$ groups may include aliphatic hydrocarbons with higher degrees of branching, cyclic hydrocarbons, as well more polar groups that contain heteroatoms such as O, S, N, including linear or branched alkyleneoxy chains such as oligo- or poly-[ethyleneglycol] and the like. Group $R_c$ can also be a difunctional moiety that bridges two or more benzimidazolone groups, as illustrated in the general formula,

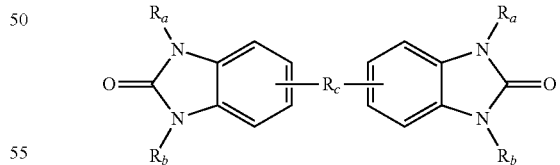

where examples of suitable difunctional groups $R_c$ include —$(CH_2)_n$—; —X—$(CH_2)_n$X; —[$XCH_2CH_2)_n$]X—; —[(C═O)—$(CH_2)_n$—(C═O)]—; —X—[(C═O)—$(CH_2)_n$—(C═O)]—X—; —X—[(C═O)—X—$(CH_2)_n$—X—(C═O)]—X—; —[(C═O)—X—$(CH_2)_n$—X—(C═O)]—, wherein X is defined as O, S, or NH and integer n is 1 to 50; and also large branched alkylated functional groups such as:

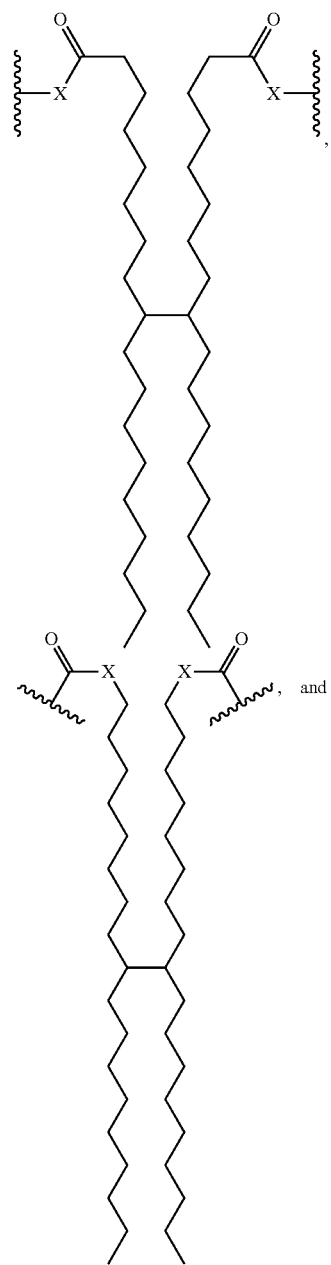, and

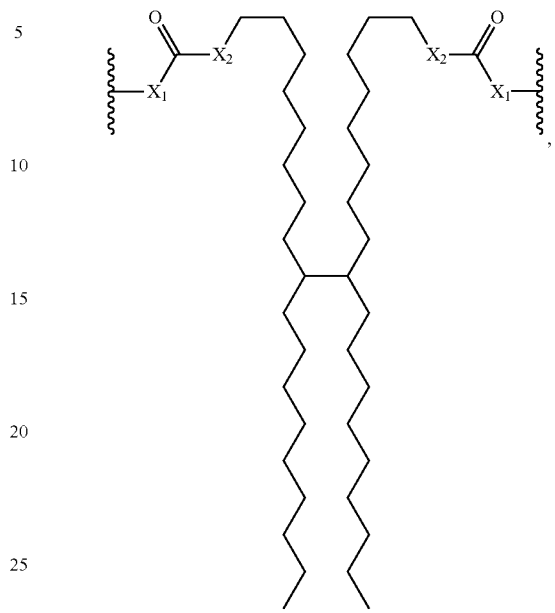

wherein X, $X_1$ and $X_2$ are defined as being either O, S, or NH, and $X_1$ and $X_2$ may or may not be the same.

These alkylated benzimidazolone compounds are desirably amphiphilic compounds. That is, the compounds include a pigment-affinic group (the benzimidazolone moiety) that is capable of H-bonding with the benzimidazolone group of the pigment, and which can potentially interfere with the pigment's intermolecular H-bonding network to thereby inhibit pigment aggregation and particle growth. The compound also includes bulky aliphatic groups that provide a steric barrier layer on the pigment surface, which also helps to limit or disperse away other colorant molecules from approaching and form larger crystals.

Specific examples of the alkylated benzimidazolone compounds thus include, but are not limited to, those in the following Tables 1 and 2:

TABLE 1

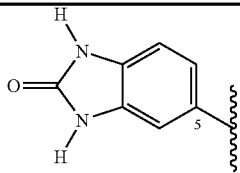

| Position 5 functional moiety | X | Sterically Bulky Group(s) | | |
| --- | --- | --- | --- | --- |
| | | $R_1$ | $R_2$ | $R_3$ |
| 1 ⸺X⸺C(O)⸺$R_1$ | NH | $(CH_2)_nCH_3$ n = 2, 11, 17 | — | — |

TABLE 1-continued

| # | Col1 | Col2 | Col3 | Col4 | Col5 |
|---|---|---|---|---|---|
| 2 | ⸺X−C(=O)−R₁ | NH | (CH₂)$_m$CH₃ / (CH₂)$_n$CH₃ (branched)<br>m = 5, n = 3<br>m = 7, n = 5<br>m = 11, n = 9 | — | — |
| 3 | ⸺X−C(=O)−R₁ | NH | (branched alkyl structure) | — | — |
| 4 | ⸺X−C(=O)−R₁ | NH | (branched alkyl structure) | — | — |
| 5 | ⸺X₁−C(=O)−X₂−R₁ | X₁ = NH<br>X₂ = NH | (CH₂)$_n$CH₃<br>n = 11, 17 | — | — |
| 6 | ⸺X₁−C(=O)−X₂−R₁ | X₁ = O<br>X₂ = NH | (CH₂)$_n$CH₃<br>n = 11, 17 | — | — |
| 7 | ⸺X(R₁)−R₂ | N | H | (CH₂)$_n$CH₃<br>n = 1, 17 | — |
| 8 | ⸺X(R₁)−R₂ | N | H | ⸺(CH(CH₃)−O)$_n$−(CH₂)$_m$CH₃<br>m = 3, n = 2<br>m = 3, n = 3 | — |
| 9 | ⸺X(R₁)−R₂ | N | (CH₂)$_n$CH₃<br>n = 3, 11, 17 | (CH₂)$_n$CH₃<br>n = 3, 11, 17 | — |
| 10 | ⸺X(R₁)−R₂ | N | ⸺(CH(CH₃)−O)$_n$−(CH₂)$_m$CH₃<br>m = 3, n = 2<br>m = 3, n = 3 | ⸺(CH(CH₃)−O)$_n$−(CH₂)$_m$CH₃<br>m = 3, n = 2<br>m = 3, n = 3 | — |
| 11 | ⸺X(R₁)−R₂ | N | ⸺(CH₂CH₂−O)$_n$−(CH₂)$_m$CH₃<br>m = 1, n = 3 | ⸺(CH₂CH₂−O)$_n$−(CH₂)$_m$CH₃<br>m = 1, n = 3 | — |

TABLE 1-continued

| | | | | |
|---|---|---|---|---|
| 12 | [structure: R₃-X⁺(R₂)-R₁] | N | $(CH_2)_n CH_3$<br>n = 1, 17 | $(CH_2)_n CH_3$<br>n = 1, 17 | $(CH_2)_n CH_3$<br>n = 1, 17 |
| 13 | [structure: R₃-X⁺(R₂)-R₁] | N | [structure: -(CH(CH₃)-CH₂-O)ₙ-(CH₂)ₘCH₃]<br>m = 3, n = 2<br>m = 3, n = 3 | [structure]<br>m = 3, n = 2<br>m = 3, n = 3 | [structure]<br>m = 3, n = 2<br>m = 3, n = 3 |
| 14 | [structure: R₃-X⁺(R₂)-R₁] | N | [structure: -(CH₂-CH₂-O)ₙ-(CH₂)ₘCH₃]<br>m = 1, n = 3 | [structure]<br>m = 1, n = 3 | [structure]<br>m = 1, n = 3 |

| | | Position 5 functional moiety | $R_1$ | $R_2$ | $R_3$ |
|---|---|---|---|---|---|
| 15 | [structure: X₁-C(=O)-X₂-R₃] | $X_1 = X_2 = NH$ | H | H | [long branched alkyl chain structure] |

TABLE 1-continued
| 16 | 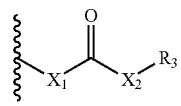 | $X_1 = O$<br>$X_2 = NH$ | H | H | 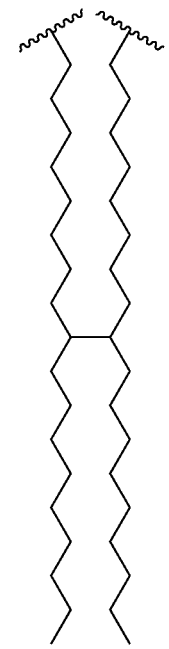 [SMILES: *CCCCCCCCC(CCCCCCCCC)C(CCCCCCCC*)CCCCCCCCC] |
| 17 | 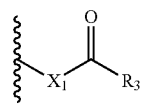 | $X_1 = NH$ | H | H | 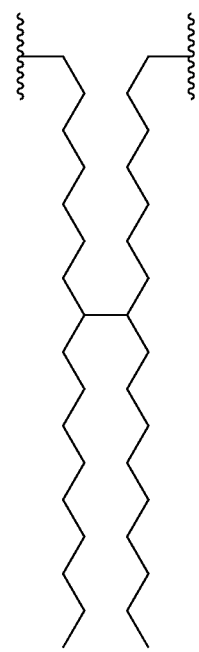 [SMILES: *CCCCCCCC(CCCCCCCCC)C(CCCCCCC*)CCCCCCCCC] |

TABLE 1-continued
| 18 | 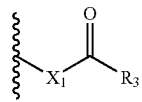 | $X_1 = O$ | H | H | 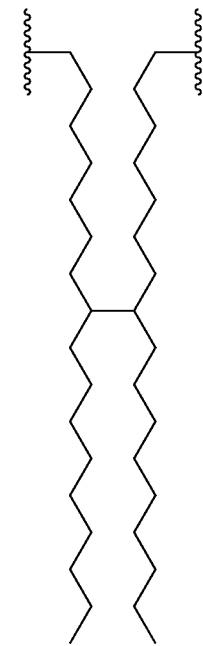 [SMILES: *CCCCCCCC(CCCCCCCCC)C(CCCCCCC*)CCCCCCCCC] |
| 19 | 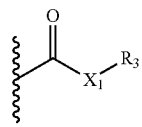 | $X_1 = O$ | H | H | 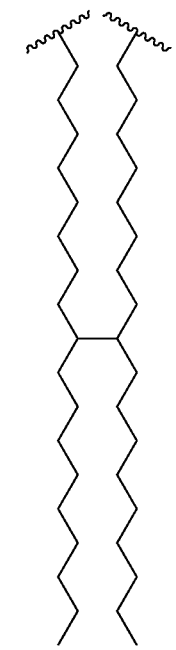 [SMILES: *CCCCCCCCC(CCCCCCCCC)C(CCCCCCCC*)CCCCCCCCC] |

TABLE 1-continued

| 20 | ![acyl X1-R3] | $X_1 = NH$ | H | H | [two long branched alkyl chains] |
|----|---|---|---|---|---|

| | ![benzimidazolone with R1, R2, position 5] | | | | |

| 21 | ![NH-C(O)-CH2-C(O)-CH3] | — | H | —(CH$_2$)$_n$CH$_3$<br>n = 1, 17 | — |
| 22 | ![3-hydroxy-2-naphthamide] | — | —(CH$_2$)$_n$CH$_3$<br>n = 1, 17 | H | — |
| 23 | ![acetoacetamide hydrazone with DC$_n$] | — | H | H | — |
| 24 | ![naphthoquinone hydrazone with DC$_n$] | — | H | H | — |

TABLE 2

$R_a = R_b = H$

| Group X | | $R_c$ |
|---|---|---|
| 1 | $X_1 = X_2 = NH$ | |
| 2 | $X_1 = O$, $X_2 = NH$ | |
| 3 | $X_1 = NH$ | |
| 4 | $X_1 = O$ | |
| 5 | $X_1 = O$ | |
| 6 | $X_1 = NH$ | |

In the above compounds, the DCn diazo moiety can be, for example, the diazo moieties $DC_1$ to $DC_7$ described above.

The N-alkylated 5-amidobenzimidazolone compounds (such as entries 1-4 in Table 1) are prepared from commercially available materials using any desired or effective method. For example, an alkanoic acid chloride can be reacted with 5-aminobenzimidazolone in approximately equimolar amounts at a suitable temperature, optionally in the presence of a solvent, and optionally in the presence of a base.

There are many methods for activating alkanoic acids for reactivity with nucleophiles such as amines, alcohols, etc., that are well-known and familiar to those skilled in the art. One method involves conversion of the alkanoic acid to the corresponding alkanoic acid chloride using any desired or effective method to those skilled in the art. For example, the alkanoic acid chloride may be prepared from the corresponding alkanoic acid precursor by reaction with a chlorinating reagent, typically in the presence of a solvent, and optionally in the presence of a catalyst. Suitable chlorinating reagents may include, but are not limited to, oxalyl chloride, thionyl chloride, phosphorous trichloride, or phosphorous pentachloride. Other reagents may also be used to activate the carboxylic acid for reaction with the amine, including but not limited to dicyclohexylcarbodiimide (DCC), diisopropylcarbodiimide (DIC), and benzotriazoles.

More specifically, the alkanoic acid can be reacted with oxalyl chloride in the presence of an optional catalyst at about 0 to about 5° C. in a suitable solvent. Examples of catalysts include N,N-dimethylformamide (DMF). The catalyst, when used, can be present in any desired or effective amount. In one embodiment at least about 0.1 mol percent, in another embodiment at least about 0.5 mol percent, in another embodiment at least about 1 mol percent, in another embodiment at least about 10 mol %, and yet in another embodiment at least about 20 mol % based on the amount of oxalyl chloride, although the amount can be outside these ranges.

The alkanoic acid and oxalyl chloride are present in any desired or effective relative amounts, such as about 0.8 mol to about 3.0 mol of oxalyl chloride per every mol of alkanoic acid, or about 1.0 mol to about 2.0 mol of oxalyl chloride per every mol of alkanoic acid, or about 1.2 mol to about 1.5 mol of oxalyl chloride per every mol of alkanoic acid, although the relative amounts can be outside of these ranges.

Subsequent to the reaction between the alkanoic acid and oxalyl chloride, the first reaction product need not be recovered; the reaction mixture can be appropriately mixed with an amino-benzimidazolone such as a 5-amino-benzimidazolone, along with the addition of solvent and base if desired, to complete the reaction. Alternatively, the first reaction product alkanoic acid chloride may be isolated prior to mixing with 5-aminobenzimidazolone, along with the addition of an optional solvent and base if desired to complete the reaction. The first reaction product and 5-amino-benzimidazolone can be present in any desired or effective relative amounts, such as about 0.8 mol to about 1.1 mol, or about 1.0 mol, of the first reaction product per every mol of 5-aminobenzimidazolone, although the relative amounts can be outside of these ranges.

N-Alkylated 5-ureidobenzimidazolones, as in entry 5 in Table 1 and entry 1 in Table 2, can be prepared by conventional methods from alkylisocyanate reactants by any desired or effective method. For example, 5-aminobenzimidazolone can be reacted with a desired alkylisocyanate of the formula OCN—$R_1$ in approximately equimolar amounts at a specified temperature, optionally in the presence of a solvent. Thereafter the resulting product is obtained in very high purity simply by precipitation with water, followed by washing and drying.

The alkylisocyanate and 5-aminobenzimidazolone can be present in any desired or effective relative amounts, such as in one embodiment about 0.4 mol to about 1.4 mol, or about 0.6 mol to about 1.2 mol, or about 0.8 mol to about 1.0 mol of the first reaction product per every mol of 5-aminobenzimidazolone, although the relative amounts can be outside of these ranges.

O-Alkylated carbamates or urethanes, such as entry 8 in Table 1 can be prepared readily by reaction of 5-hydroxybenzimidazolone with an alkyl isocyanate or polyisocyanate, such as octadecyl isocyanate or the diisocyanate derivative of C-36 dimer acid (obtained from Henkel Corp. as DDI 1410™), in the presence of a catalytic amount of a Lewis Acid catalyst, such as for example dibutyltin dilaurate, and with mild heating. The reactant 5-hydroxybenzimidazolone can be prepared by various methods reported previously in the literature, which are totally incorporated herein by reference, such as for example U.S. Patent Application No. 2005/0176726 involving demethylation of 5-methoxybenzimidazolone, or as described in *Australian J. Chem.*, 1986, 39(2), 295-301 by the over-oxidation of benzimidazole with lead tetraacetate, or by the methods reported in *J. Am. Chem. Soc.* 1958, 80, 1657-1662 and in. U.S. Pat. No. 4,138,568, which describe the reaction between 5-hydroxy-1,2-phenylene diamine with phosgene in aqueous hydrochloric acid or molten urea gives 5-hydroxybenzimidazolone in good yields.

The alkylisocyanate and 5-hydroxybenzimidazolone can be present in any desired or effective relative amounts, such as about 0.4 mol to about 1.4 mol or about 0.6 or about 0.8 to about 1.0 or about 1.2 mol of the first reaction product per every one mol of 5-hydroxybenzimidazolone, although the relative amounts can be outside of these ranges.

Examples of suitable catalysts include (but are not limited to) Lewis acid catalysts such as dibutyl tin dilaurate, bismuth tris-neodecanoate, cobalt benzoate, lithium acetate, stannous octoate, triethylamine, ferric chloride, aluminum trichloride, boron trichloride, boron trifluoride, titanium tetrachloride, tin tetrachloride, and the like. The catalyst, when present, can be present in any desired or effective amount, such as at least about 0.2 mole percent, at least about 0.5 mole percent, or at least about 1.0 mole percent, but desirably no more than about 10 mole percent, or no more than about 7.5 mole percent, or no more than about 5.0 mole percent, based on the amount of isocyanate, although the amount can be outside these ranges.

The substituted amino or ammonium groups at position 5 of the benzimidazolone compounds, such as in entries 12-14 of Table 1, can also be produced in one step by an alkyl substitution reaction (or, alkylation reaction) between 5-aminobenzimidazolone and 1.0-3.0 molar equivalents of a suitable alkylating reagent such as an alkyl halide, wherein the halogen is selected from F, Cl, Br, I; or a suitable alkyl ester of an alkanesulfonate or arenesulfonate reagent such as alkyl methanesulfonates (commonly known as alkyl mesylates, or alkyl para-toluenesulfonates (commonly known as alkyl tosylates), or alkyl trifluoromethanesulfonate (commonly known as alkyl triflates) wherein the corresponding leaving group is the mesylate, tosylate or triflate anion; or, a suitable alkyl ester of a carboxylic acid, such as alkyl acetate, alkyl formate, alkyl propionate and the like, wherein the leaving group that is displaced is the acetate, formate, propionate, etc.

The alkylating agent and 5-aminobenzimidazolone can be present in any desired or effective relative amounts, such as about 0.4 mol to about 1.4 mol or about 0.6 to about 1.2 mol or about 0.8 mol to about 1.0 mol of the first reaction product per every one mol of 5-aminobenzimidazolone, although the relative amounts can be outside of these ranges.

Examples of suitable catalysts include but are not limited to halide salts such as potassium iodide or sodium iodide, and the like. The catalyst, when present, can be present in any desired or effective amount, such as at least about 20 mole percent, at least about 50 mole percent, or at least about 100 mole percent, but desirably no more than about 100 mole percent, or no more than about 75 mole percent, based on the amount of alkylating reagent, although the amount can be outside these ranges.

Other alkylated benzimidazolone compounds, including those shown in Tables 1 and 2 and compounds similar thereto, can be made by similar reaction schemes. Such additional alkylated benzimidazolone compounds are also within the scope of the present disclosure.

In additional embodiments, other stabilizer compounds having different structures than those described previously may be used in addition to the sterically bulky stabilizer compounds of this invention, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such branched alcohols, non-ionic surfactants including long-chain or branched hydrocarbon alcohols, such as for example 2-ethylhexanol, lauryl alcohol, and stearyl alcohol, and alcohol ethoxylates; acrylic-based polymers such as poly(acrylic acid), poly(methyl methacrylate), styrene-based copolymers such as poly(styrene sodio-sulfonate) and poly(styrene)-co-poly(alkyl(meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate). Any one of the above stabilizers, and combinations thereof, can be used in the preparation of the nanoscale pigment particles, at an amount that ranges from about 0.5 wt % to about 50 wt %, such as from about 1 wt % to about 25 wt %, although the amount can also be outside of these ranges.

The types of non-covalent chemical bonding that can occur between the pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the pigment.

The "average" pigment particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size data, which is sometimes expressed as Z-avg, can be measured by methods that use light scattering technology to infer particle size, such as Dynamic Light Scattering. The term "particle diameter" as used herein refers to the length of an anisotropic pigment particle at its longest dimension (in the case of acicular shaped particles) as derived from images of the particles generated by Transmission Electron Microscopy (TEM). The term "nanoscale", "nanoscopic", or "nano-sized" pigment particles refers to either an average particle size, $d_{50}$ or Z-avg, or an average particle length of less than about 150 nm, such as of about 1 nm to about 120 nm, or about 10 nm to about 100 nm. Geometric standard deviation is a unitless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln\mu_g)^2}{n}}$$

In embodiments, the nanoparticles of azo-benzimidazolone pigments are generally synthesized in one or more process steps. The pigment nanoparticles are produced directly in the reaction medium during the synthesis, however optional post-synthesis refinement is possible to tailor surface chemistry for the intended use of such pigment nanoparticles. In one method, the bulk azo-benzimidazolone pigment is synthesized in a first process by using diazotization and coupling reactions, and then the pigment solids transformed into nanoparticle form using a second process step, such as by a pigment reprecipitation method. In a reprecipitation step, the crude bulk pigment is molecularly dissolved using a good solvent, followed by a pigment precipitation that is triggered by the controlled addition of an appropriate nonsolvent. However, for most manufacturable and economical purposes, a direct synthesis of azo-benzimidazolone pigment nanoparticles by a diazotization and coupling process is more desirable. These processes are shown generally in schemes 1 and 2 below:

Scheme 1:

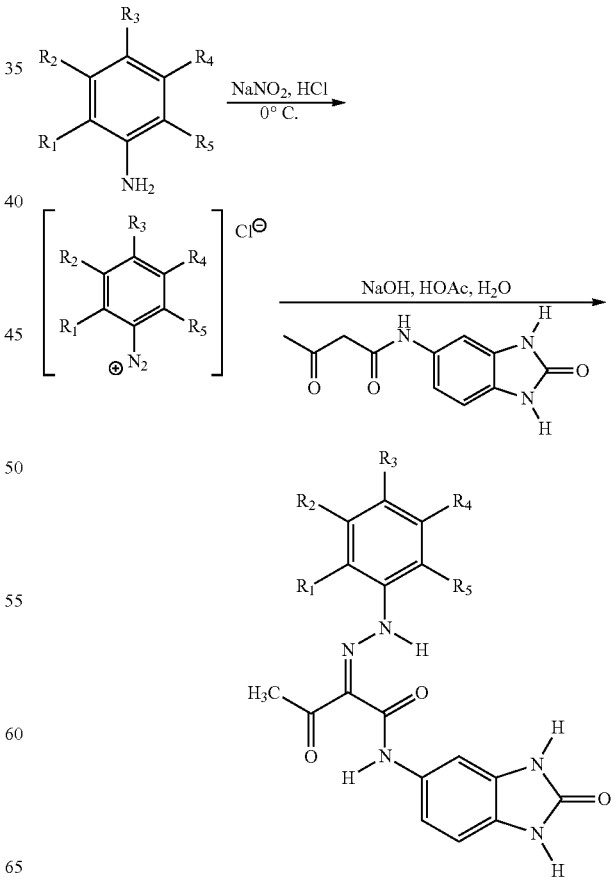

Scheme 2:

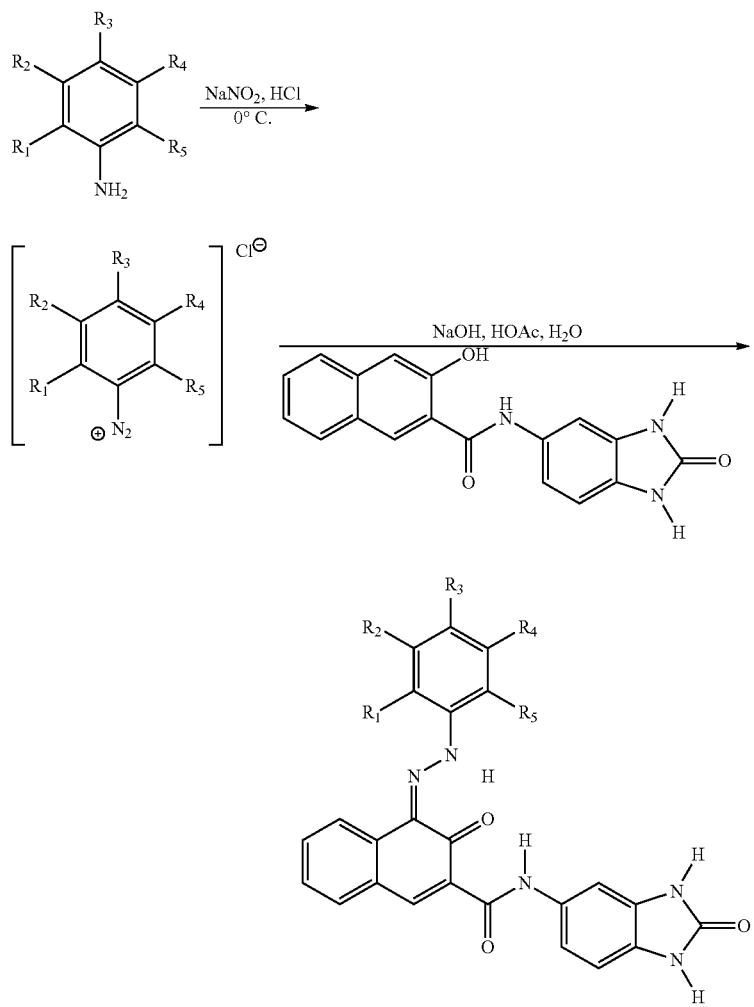

The method of making nanoscale particles of azo-benzimidazolone pigments (herein referred to as simply, benzimidazolone pigments) such as those illustrated in the general reactions in Schemes 1 and 2 above, is a direct synthesis process that involves at least one or more reactions. Diazotization is a key reaction step wherein a suitably substituted aromatic amine or aniline precursor is converted, either directly or indirectly, to its corresponding diazonium salt. The conventional reaction procedures involve treating an aqueous solution of the precursor with an effective diazotizing agent such as nitrous acid $HNO_2$ (which is generated in situ by the reaction of sodium nitrite with dilute acid solution such as hydrochloric acid), or alternatively in some cases, using nitrosyl sulfuric acid (NSA), which is commercially available or can be prepared by mixing sodium nitrite in concentrated sulfuric acid. The diazotization reaction is typically carried out in acidic aqueous solutions and at cold temperatures so as to keep the diazonium salt thermally stable, but in some cases may be carried out at room temperatures. The reaction results in forming a diazonium salt which is either dissolved in the medium, or is finely suspended as solid particles in the medium.

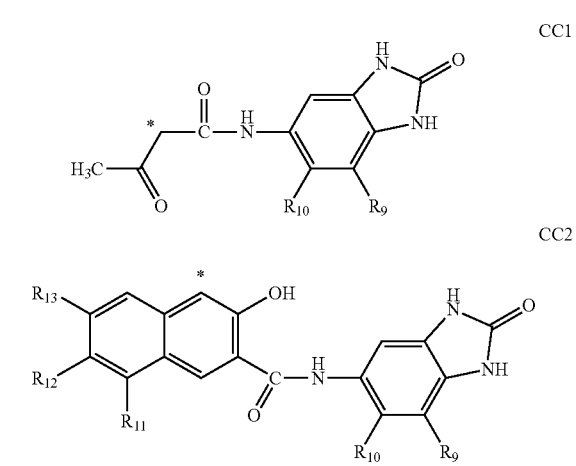

A second solution or solid suspension is prepared by either dissolving or suspending the benzimidazolone coupling component (most commonly the structures CC1 or CC2 as shown above) into aqueous medium, typically an alkaline solution to aid dissolution and then subsequently treated with acids and/ or bases to render the benzimidazolone coupling component into a buffered acidic aqueous solution or a buffered fine suspension, which is required for reaction with the diazonium salt solution. Suitable acids, bases and buffers include, for example, sodium or potassium hydroxide, acetic acid, and sodium acetate. The solution or fine suspension of the coupling agent may optionally contain other liquids such as an organic solvent (for example, iso-propanol, tetrahydrofuran, methanol, N-methyl-2-pyrrolidone, N,N-dimethylacetamide, dimethylsulfoxide, or the like) as a minor co-solvent. The second solution additionally contains any surface active agents, and includes the sterically bulky stabilizer compounds such as those described previously. This second solution is charged into a larger vessel in order to carry out the final reaction step, which is the coupling reaction involving the controlled addition of the diazonium salt solution at ambient or other suitable temperatures that can range from about 10° C. to about 75° C., thereby producing the pigment solids as a suspended precipitate in the aqueous slurry. As one will expect, there are several chemical and physical processing parameters that will affect the quality and characteristics of the pigment particles—such as average crystallite size, particle shape and particle distribution—and these process parameters include (but are not limited to): the relative stoichiometries of the starting diazo and coupling components as reactants, the order and the rate of reactant addition, the type and relative amount (loading) of any surface active agents and/or steric stabilizer compounds that are used in the synthesis, the relative concentrations of chemical species in the liquid medium, pH of liquid medium, temperature during coupling reaction, agitation rate, the performance of any postsynthesis processing steps such as heating to increase tinctorial strength, and also the methods for recovering and drying of the final particles.

As a general matter for the preparation of azo-benzimidazolone pigments comprising a single azo group, the starting diazo and coupling components are provided in an approximately stoichiometric (or 1:1 molar) ratio. In embodiments, the coupling component may have limited solubility in the coupling medium whereas the diazo component is generally soluble, in which case it is beneficial to use a very small excess of the diazo component, ranging from about 0.01 to about 0.25 molar equivalents, such as from about 0.01 to about 0.10 molar equivalents of excess diazo component relative to the moles of coupling component. By having a slight molar excess of diazo component, it is ensured that all of the insoluble coupling component is completely converted to pigment product. The excess diazo component would then be removed by washing of the final product. In contrast, if an excess of the insoluble coupling component were to be used, then any unreacted coupling component would remain in the final product mixture since it will be difficult to remove by washing, and may affect the properties of the nanoscale pigment.

The reaction conditions can also influence the quality and characteristics of the pigment particles. As a general matter for the diazotization reaction, the liquid medium in embodiments should be maintained such that the concentration of the diazo component, or diazonium salt reactant, does not exceed about 0.1 M to about 1.0 M, such as from about 0.2 M to about 0.80 M, or from about 0.30 M to about 0.60 M, although the concentration of the diazo component/diazonium salt in the liquid diazotization medium can also be outside these ranges. The amount of diazotizing reagent, which in embodiments is desirably a water-soluble and acid-miscible reagent such as sodium nitrite or nitrosyl sulfuric acid, should be approximately stoichiometric (or, 1:1 molar ratio) with the molar quantity of diazo component that is used, although a very small excess of the diazotizing reagent may also be used in the range of about 0.005 to about 0.20 molar equivalents of excess diazotizing reagent relative to the moles of diazo component precursor. The type of acid that can be used can include any suitable mineral acid such as hydrochloric acid and sulfuric acid, as well as organic acids such as acetic acid and proprionic acid, or various combinations of mineral and organic acids. In general for diazotization reactions used in the synthesis of colorants, the acid reactant is delivered as an aqueous solution to solubilize the reactive nitrosylating species and the resultant diazonium salt that is formed in the reaction. In embodiments, the concentrations of acid reactant is used in an excess amount relative to the moles of diazo precursor (the limiting reagent), and this amount can range from about 1.5 to about 5.0 excess molar equivalents, such as from about 2.0 to about 4.0 excess molar equivalents of acid relative to moles of diazo precursor; however, the actual excess amount can also be outside of these ranges if the case requires it.

The diazotization reaction is typically conducted at low temperatures in order to ensure that the resulting diazonium salt product is thermodynamically stable. In embodiments, the diazotization reaction is performed at temperatures ranging from $-10°$ C. to about 5° C., such as from about $-5°$ C. to about 3° C., or from about $-1°$ C. to about 2° C. The nitrosylating reagent is typically added in aqueous solution so as to provide a total diazonium salt concentration as disclosed above, and the rate at which this aqueous solution of nitrosylating reagent is slowly added can vary depending on the scale of the reaction; however, typically the addition rate is controlled by maintaining the internal temperature throughout the course of the diazotization reaction to between $-10°$ C. and 5° C., such as between about $-1°$ C. to about 2° C. Following the complete addition of the nitrosylating reagent, the diazotization reaction mixture is stirred for an additional period of time that can vary from 0.25 hr to about 2 hr, again depending on the scale of the reaction.

An additional challenge is that many of the sterically bulky stabilizer compounds disclosed in embodiments also have the poor solubility characteristics of the coupling components and/or pigments, since they are amphiphilic structures with polar hydrogen-bonding groups and also long alkyl chains which generally resist solubilization in aqueous media. Therefore for a successful coupling reaction step, effective wetting and mixing of the coupling component and a sterically bulky stabilizer needs to be ensured, preferably before the addition of the diazonium salt solution. Furthermore, by having good miscibility and wetting in the coupling component mixture prior to reaction with the diazonium salt, the pre-formation of hydrogen-bonding interactions between the steric stabilizer and the coupling agent would be facilitated, and additionally may favorably influence the particle size and morphology of the resulting benzimidazolone pigment nanoparticles.

The coupling component mixture of embodiments is comprised of the appropriate coupling component for synthesis of benzimidazolone pigment, a sterically bulky stabilizer compound, an alkaline base component, at least one acid buffer component, and an optional water-miscible organic solvent. The amount of coupling component that is used is generally stoichiometric (or, 1:1 molar ratio) with the diazo component, as explained previously. However in embodiments, the coupling component may have limited solubility in the coupling medium whereas the diazo component is generally soluble, in which case it is desirable to use a very small excess of the diazo component, ranging from about 0.01 to about 0.25 molar equivalents, such as from about 0.01 to about 0.10 molar equivalents of excess diazo component relative to the moles of coupling component. By having a slight molar excess of diazo component, it is ensured that all of the insoluble coupling component is completely converted to pigment product. The alkaline base is used to first solvate the coupling component into aqueous solution, and is generally selected from inorganic bases such as sodium or potassium hydroxide, or may also be selected from organic, non-nucleophilic bases such as tertiary alkyl amines that include, for example, triethylamine, triethanolamine, diethylaminoethanol, Dytek series of amines, DABCO (1,8-diazobicyclo[2.2.2]octane), and the like. An excess amount of alkaline base is normally used, ranging from about 2.0 to about 10.0 molar equivalent excess, such as from about 3.0 to about 8.0 molar equivalent excess of base, relative to moles of coupling component that are used, although the amount of actual base used may also be outside of these ranges if it is required. The acid is used to neutralize both the base component and the coupling component so as to cause the fine reprecipitation of the coupling component in a buffered aqueous medium. It is typical to use common inorganic and organic acids for this purpose, such as hydrochloric acid or acetic acid, and the amount of acid used is approximately stoichiometric (or, 1:1 molar ratio) to the total amount of alkaline base component used for preparing the coupling component mixture, which provides a weakly acidic buffer medium.

The steric stabilizer compound can be introduced directly into the coupling mixture in the form of a solid or liquid, depending on the nature of the selected stabilizer, or more optionally it may be introduced as a solution in organic solvent. The amount of steric stabilizer compound that is added to the coupling component mixture, for effectiveness in stabilizing and controlling the nanoparticle size of the resulting benzimidazolone pigment, can range from about 0.01 wt % to about 50 wt %, such as from about 0.5 wt % to about 25 wt %, or from about 5 wt % to about 10 wt % based on the final yield (mass) of benzimidazolone pigment to be produced. The concentration of steric stabilizer in the solvent can vary greatly, so long as the steric stabilizer is rendered into a dispersed, emulsified or soluble form in the organic solvent. Any water-miscible organic solvent may be used, with the provision that it does not react with the diazonium salt reactant or any residual nitrosylating species. Suitable organic solvents include aliphatic alcohols such as methanol, ethanol, isopropanol, n-butanol, isobutanol, sec-butanol, hexanol, cyclohexanol, dimethyl sulfoxide, ethyl methyl sulfoxide, N,N-dimethyl formamide, N,N-dimethylacetamide, N-methylpyrrolidinone, tetrahydrofuran, dimethoxyethane, alkylene glycols such as ethylene glycol, diethylene glycol, propylene glycol, dipropylene glycol, Dowanol®, and their mono- or di-alkyl ethers, and the like. Particularly suitable solvents in embodiments include aliphatic alcohols such as methanol, ethanol, isopropanol, and n-butanol, dimethyl sulfoxide, and tetrahydrofuran, or combinations thereof. If desired, the amount of optional organic solvent that is used for dispersing steric stabilizer can range from about 0 to about 50 volume %, and preferably from about 2 to about 20 volume % based on total liquid volume of the coupling component mixture.

It may be desirable to use heating, or high-shear mixing, to facilitate dispersion, emulsification or solubilization of a stabilizer compound, even in the presence of an optional organic solvent. In particular embodiments, it is also advantageous to incorporate the stabilizer into the aqueous coupling medium at a temperature ranging from 10-100° C. in order to achieve good dispersion. The stabilizer can also be introduced to the aqueous coupling medium at a pH that ranges from moderately acidic to strongly basic (that is, a pH range from about 3 to 12). In embodiments, it is desired that the stabilizer is added to a coupling mixture at a pH ranging between 2-9, such as between 4-7, although it can also potentially be added to a solution having pH outside of these ranges. The stabilizer can be added to the coupling mixture at any suitable rate, so long as adequate mixing and dispersion is allowed to occur.

In the preparation of the coupling component mixture, the order of addition of the reactants can be carried out by several suitable processes, such as by: 1) adding the steric stabilizer (either neat or in organic solvent) directly into the alkaline solution of coupling component, and thereafter adding the acid component to cause the fine reprecipitation of the coupling component in a buffered acidic medium; or, 2) separately and sequentially adding the alkaline solution of coupling component and the steric stabilizer (either neat or in organic solvent) to a prepared aqueous solution of the acid component, the result of which causes the fine reprecipitation of the coupling component in the presence of steric stabilizer compound under acidic conditions. In both these processes, the coupling component is rendered as a fine particle suspension with non-covalently associated steric stabilizer compound.

For the final coupling reaction of the diazonium salt solution and the coupling component, the order and rate of addition of these key reactants in the presence of steric stabilizer, can have profound effects on physical and performance characteristics of the final benzimidazolone pigment particles. In embodiments, a "Consecutive Addition" method was used as is commonly practiced in industrial pigment manufacturing, wherein the two pigment precursors (diazo and coupling components) are added consecutively at different times to a final reaction mixture that already contains the dispersed or emulsified steric stabilizer compound. For example, in the synthesis of Pigment Yellow 151 nanoparticles according to this consecutive method of reactant addition, and using the steric stabilizer compound #23 in Table 1 where m=11 and n=9, the particles that formed were observed by SEM/STEM imaging to be shortened rod-like primarily particles and aggregates, having length:width aspect ratios ranging from about 2 to about 5, and had average particle sizes measured by dynamic light scattering that ranged from about 50 nm to about 200 nm, more typically from about 75 nm to about 150 nm.

The internal temperature of the coupling reaction mixture can range from about 10° C. to about 60° C., such as from about 15° C. to about 30° C., in order to produce an aqueous slurry of the desired benzimidazolone pigment nanoparticles. An internal temperature of greater than 30° C. may cause the final pigment particle size to increase undesirably. While the advantages of heating a chemical reaction include faster reaction times and development of the final product, in particular color development of benzimidazolone pigments in general, heating is also known to facilitate aggregation and coarsening of particles, which is not desirable for the applications of this invention.

An alternative to increasing the internal temperature to speed reaction is to increase the agitation rate. During this reaction, as the pigment is formed, the mixture thickens considerably, requiring strong mechanical agitation to achieve sufficient mixing. In certain situations, it is possible to lower the viscosity of the slurry by adding in a very small quantity of surface active agent, such as a few droplets of 2-ethylhexanol, which also can provide a beneficial defoaming effect, particularly at larger scales of this reaction. The shear forces exerted while vigorously stirring the reaction mixture, in combination with the benefit of the surface active agent for controlling viscosity and foaming, may also offer a synergistic benefit to reducing the size and size distribution of the pigment nanoparticles.

In embodiments, the slurry of pigment nanoparticles is not treated nor processed any further, such as performing additional heating, but instead is isolated immediately by vacuum filtration or centrifugal separation processes. For example, contrary to prior art processes that required boiling of the product in concentrated acetic acid in order to aid color development, such subsequent processes are not required in embodiments where the sterically bulky stabilizer compounds are used. The pigment solids can be washed copiously with deionized water to remove excess salts or additives that are not tightly associated or bonded with the pigment particle surface. The pigment solids are preferably dried by freeze-drying under high vacuum, or alternatively, by vacuum-oven drying at low temperatures, such as from about 25-50° C., so as to prevent fusing of primary nanoparticles during bulk drying with heat. The resulting pigment consists of predominantly nanoscale primary particles and nanoscale particle aggregates that are loosely agglomerated and of high quality, which when imaged by TEM (Transmission Electron Microscopy), exhibit rod-like nanoparticles having lengths of from about 50 nm to about 150 nm, and predominantly from about 75 nm to about 125 nm. When these particles were measured for average particle size, Z-avg or $d_{50}$ as colloidal dispersions in n-butanol by Dynamic Light Scattering technique, the values ranged from about 80 nm to about 200 nm, and predominantly from about 100 nm to about 150 nm. (Here it must be mentioned that average particle size, $d_{50}$ or Z-avg, is measured by Dynamic Light Scattering, which an optical technique that measures the hydrodynamic radius of non-spherical pigment particles gyrating and translating in a liquid dispersion via Brownian motion, by measuring the intensity of the incident light scattered from the moving particles. As such, the $d_{50}$ or Z-avg particle size metric obtained by Dynamic Light Scattering technique is always a larger number than the actual particle dimensions (length, width) observed by SEM or TEM imaging.)

The shape of the nanoscale benzimidazolone pigment particles using the above methods of preparation are generally rod-like, but can be one or more of several other morphologies, including platelets, needles, prisms or nearly spherical, and the aspect ratio of the nanoscale pigment particles can range from 1:1 to about 10:1, such as having aspect ratio between 1:1 and 5:1; however the actual metric can lie outside of these ranges.

Pigment particles of benzimidazolone pigments such as Pigment Yellow 151 and Pigment Red 175 that have smaller particle sizes could also be prepared by the above method in the absence of using sterically bulky stabilizers and with the use of surface active agents alone (for example, using only rosin-type surface agents), depending on the concentrations and process conditions employed, but the pigment product will not predominantly exhibit nanoscale particles nor will the particles exhibit regular morphologies. In the absence of using the sterically bulky stabilizer compound, the methods described above generally produce a broad distribution of elongated rod-like particle aggregates, ranging in average particle diameter from 150 to greater than 1000 nm and with large (length:width) aspect ratios exceeding about 5:1. Such particles are very difficult to either wet and/or disperse into a matrix for coating applications, and will generally give poor coloristic properties. In embodiments, the combined use of a suitable sterically bulky stabilizer compound with optionally a minor amount of suitable surface active agent, such as rosin-type surfactants or alcohol ethoxylates, using the synthesis methods described previously would afford the smallest pigment particles having nanoscale dimensions, more narrow particle size distribution, and low aspect ratio of less than about 5:1.

The advantages of this process include the ability to tune particle size and composition for the intended end-use application of the benzimidazolone pigment, such as toners and inks and coatings, which include phase-change, gel-based and radiation-curable inks, solid and non-polar liquid inks, solvent-based inks and aqueous inks and ink dispersions. For the end-use application in piezoelectric inkjet printing, nanoscale particles are advantageous to ensure reliable inkjet printing and prevent blockage of jets caused by pigment particle agglomeration. In addition, nanoscale pigment particles are advantageous for offering enhanced color properties in printed images.

The formed nanoscale pigment particle compositions can be used, for example, as coloring agents in a variety of ink compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including solid and non-polar phase change inks with melt temperatures of about 60 to about 130° C., solvent-based liquid inks or radiation-curable such as UV-curable liquid inks, and even aqueous inks.

The nonpolar liquid and solid phase change ink compositions according to this disclosure generally include a carrier, a colorant, and one or more optional additives. Such additives can include, for example, solvents, waxes, antioxidants, tackifiers, slip aids, curable components such as curable monomers and/or polymers, gellants, dispersants, initiators, sensitizers, humectants, biocides, preservatives, and the like. Specific types and amounts of components will depend, of course, on the specific type of ink composition, such as solid, hot melt, phase change, gel, radiation-curable or the like. The formed nanoscale benzimidazolone pigment particles can be used, for example, in such inks as colorants and if desired, as nano-fillers for enhanced mechanical robustness.

Generally, the nonpolar liquid and solid phase change ink compositions contain one or more colorants. Any desired or effective colorant can be employed in the ink compositions, including pigment, dye, mixtures of pigment and dye, mixtures of pigments, mixtures of dyes, and the like. In embodiments, the colorant used in the ink composition consists entirely of the formed nanoscale benzimidazolone pigment particles. However, in other embodiments, the nanoscale benzimidazolone pigment particles can be used in combination with other colorant materials, where the nanoscale benzimidazolone pigment particles can form substantially most of the colorant material (such as about 90% or about 95% by weight or more), they can form a majority of the colorant material (such as at least 50% by weight or more), or they can form a minority of the colorant material (such as less than about 50% by weight). Two major advantages of using nanopigments over larger-sized commercial pigments are: they ensure reliable jetting of ink formulations (printhead reliability), and enhanced coloristic performance of nanopigments, which enables a reduction of the loading of pigment within the ink composition. In still other embodiments, the nanoscale benzimidazolone pigment particles can be included in the ink composition in any other varying amount, to function either as colorant and/or to function as a nano-filler in order enhance other properties such as image robustness.

The non polar ink composition of this disclosure also includes a carrier material, or mixture of two or more carrier materials, that can be liquid or solid. For liquid ink compositions, the carrier for such inks can include: aprotic and nonpolar liquids such as simple ketones and esters like acetone, acetonitrile, methyl ethyl ketone and methyl isobutyl ketone, cyclohexanone, methyl acetate, ethyl acetate, butyl acetate, isopropyl acetate, methoxypropyl acetate, N-methylpyrrolidinone, sulfolane, N,N-dimethylformamide, N,N-dimethylacetamide, and the like; ethers such as tetrahydrofuran, dimethoxyethane, tetrahydrofurfuryl alcohol, sol-ketal, monoalkyl ethers of diethylene or dipropylene glycols such as diethylene glycol monomethyl ether, dipropylene glycol methyl ether, DOWANOL® and the like; aromatic hydrocarbons such as toluene; o-, p-, and m-xylenes and mixtures thereof; mono- and dichlorobenzenes; terpenoid solvents such as limonene, pinene, camphene, farnesene, and the like; and straight or branched chain aliphatic hydrocarbons, such as hexane, paraffinic hydrocarbons, and the like; and mixtures thereof. Examples of suitable straight and branched chain aliphatic hydrocarbons having, for example, from about 1 to about 30 carbon atoms, include the ISOPAR™ series of hydrocarbons manufactured by Exxon Corporation. These hydrocarbon liquids are considered narrow portions of iso-paraffinic hydrocarbon fractions. For example, the boiling range of ISOPAR G™ is from about 157° C. to about 176° C.; ISOPAR H™ is from about 176° C. to about 191° C.; ISOPAR K™ is from about 177° C. to about 197° C.; ISOPAR L™ is from about 188° C. to about 206° C.; ISOPAR M™ is from about 207° C. to about 254° C.; and ISOPAR V™ is from about 254.4° C. to about 329.4° C. Other suitable solvent materials include, for example, the NORPAR™ series of liquids, which are compositions of n-paraffins available from Exxon Corporation, the SOLTROL™ series of liquids available from the Phillips Petroleum Company, and the SHELLSOL™ series of liquids available from the Shell Oil Company.

Other carrier liquids or solvents that can be used to disperse the nanoscale-sized pigments with various polymers and other ink components where solubility of the polymers or resins are ensured, include drying oils, mainly consisting of polyunsaturated fatty acids, such as tung oil, soy oil, linseed oil, safflower oil, sunflower oil, canola oil, poppy seed oil, perilla oil, oiticica oil, walnut oil, various fish oils, and suitable mixtures thereof. Still other carrier liquids or solvents that can be used include non-drying oils such as paraffinic oils, naphthenic oils, isoparaffinic oils, neat's foot oil, rapeseed oil, cotton seed oil, castor oil, olive oil, coconut oil, silicone oils such as cyclomethicone and dimethicone, diester-based oils including dialkyl phthalates such as diisobutyl phthalate, dioctyl phthalate and dioctyl adipate, essential oils such as rose oil, and suitable mixtures thereof.

In the case of a solid non polar (or phase change) inkjet ink composition, the carrier can include one or more organic or polymeric compounds. The carrier for such solid ink compositions is typically solid at room temperature (about 20° C. to about 25° C.), but becomes liquid at the printer operating temperature for ejecting onto the print surface. Suitable carrier materials for solid ink compositions can thus include, for example, amides, including diamides, triamides, tetra-amides, and the like. Suitable triamides include, for example, those disclosed in U.S. Patent Publication No. 2004-0261656, the entire disclosure of which is incorporated herein by reference. Suitable other amides, such as fatty amides including monoamides, tetra-amides, mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference. In embodiments where an amide is used as a carrier material, a triamide is particularly useful because triamides are believed to have structures that are more three-dimensional as compared to other amides such as diamides and tetraamides.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like.

Additional suitable solid ink carrier materials include paraffins, microcrystalline waxes, polymethylene waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

In embodiments, these nanoscale pigments can be dispersed in a variety of media. Polymeric binders (polymeric dispersants) that aid in the dispersion and coating ability of nanoscale pigments include, but are not limited to, derivatives of rosin natural products, acrylic-based polymers, styrene-based copolymers, copolymers of α-olefins such as 1-hexadecene, 1-octadecene, 1-eicosene, 1-triacontene and the like, copolymers of vinyl pyridine, vinyl imidazole, vinyl pyrrolidinone, polyester copolymers, polyamide copolymers, and copolymers of acetals. Other examples of polymeric dispersants include, but are not limited to, poly(vinyl butyral-co-vinyl alcohol-co-vinyl acetate), poly(vinyl acetate), poly (acrylic acid), poly(methacrylic acid), poly(vinyl alcohol), poly(N-vinylcarbazole), poly(methyl methacrylate), polyvinylidene difluoride, polyesters such as MOR-ESTER 49000®, polycarbonate polymers such as Lexan®, and Merlon® M-39, and poly(2-hydroxyethyl methacrylate), poly (styrene-b-4-vinylpyridine), polyurethane resins, polyetheretherketones, phenol-formaldehyde resins, polyols such as Pluronic® and Pluronic® R polymers, glycolic polymers such as polyethylene glycol polymers and their derivatives, polysulfones, polyarylethers, polyarylsulfones, and the like. Suitable mixtures of at least two polymers can also be used to disperse nanoscale pigments in liquid media.

Many available commercial dispersants, such as those from BYK-Chemie, Efka Additives, and Lubrizol are well-suited to disperse pigments in a variety of liquid media. However, where it is applicable, for example, that a pigmented dispersion be used to make a coating, it is often generally beneficial to include a polymer resin in the pigmented dispersion to help reinforce the coated film, cohesively and adhesively, to the coating substrate. In the case where small registered drops on a substrate are obtained, such as, for example, from continuous ink jet printing or from drop on demand ink jet printing, a desired facet of an image can be improved upon, such as image gloss or rub, with the inclusion of a polymer resin in the pigmented dispersion or ink Other optional additives to the ink include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink compositions can also optionally contain an antioxidant. The optional antioxidants of the ink compositions help to protect the images from oxidation and also help to protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The carrier in a nonpolar liquid or solid ink composition can be present in ink in any desired or effective amount. For example, the carrier can be present in an amount of about 0.1 to about 99 percent by weight of the ink, such as about 50 to about 98 percent by weight of the ink, or about 75 to about 90 percent by weight of the ink, although the amount can be outside of these ranges.

The non polar solid (phase change) ink compositions of this disclosure typically have melting points greater than about 50° C., such as about 50° C. to about 160° C. or more. In embodiments, the solid ink compositions have a melting point of about 70° C. to about 140° C., such as about 80° C. to about 120° C., although the melting point can be outside of these ranges. The solid ink compositions also generally a have melt viscosity at the jetting temperature (such as typically about 75° C. to about 140° C., or about 80° C. to about 130° C. or about 100° C. to about 120° C., although the jetting temperature can be outside of these ranges) typically of about 2 to about 30 centipoise, such as about 5 to about 20 centipoise or about 7 to about 15 centipoise, although the melt viscosity can be outside of these ranges. Because solid ink hardness tends to decrease with lower viscosities, it is desired in embodiments that the viscosity be as low as possible to ensure reliable jetting performance, while still retaining the desired degree of image robustness.

The ink compositions of the present disclosure can also optionally contain other functional materials, which may depend upon the printhead type and printing process in which the ink is used. For example, the ink compositions of this discloser are typically designed for use in either a direct to substrate printing mode or an indirect or offset printing transfer system.

The ink compositions of the present disclosure can be prepared by any desired or suitable method. Preparation of pigmented nonpolar solid (phase change) ink compositions can include the partial or total inclusion of nonpolar solid ink components therein during the act of pigment dispersion making. This can also include the dispersing of nanoscale pigment at various pigment concentrations at various temperatures with various applied energies. The nanoscale pigment can be processed for dispersion, with or without the presence of a dispersant, by various means including ball mills, attritors, Cobol mills, Dyno mills, paint shakers, pearl mills, agitator mills, two-roll mills, high speed stirring, three-roll mills, flow jet mills, extruders, homogenizers, kneaders and the like.

The nanoscale pigment can be processed with or without the presence of a dispersant, and optionally with a synergist, using suitable grinding media in any of the aforementioned dispersing equipment where it is applicable, such as steel balls, metal alloyed balls and media such as those based on tungsten carbide, glass balls, glass beads, polyethylene beads, Nylon beads, cross-linked polymeric beads, ceramic beads and the like. The nonpolar solid phase change ink compositions may be prepared by combining some or all of the components, heating the mixture to at least its melting point, for example a temperature ranging from about 70° C. to about 140° C., and stirring the mixture until a substantially homogeneous and uniform melt is obtained. When pigments are the selected colorants, the molten mixture may be subjected to grinding in an attritor or ball mill apparatus to carry out the dispersion of the nanoscale pigment in the ink vehicle.

Examples are set forth herein below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Comparative Example 1

Preparation of Pigment Yellow 151 (no Steric Stabilizer, no Surfactant)

Into a 250 mL round bottom flask is charged anthranilic acid (6.0 g, available from Sigma-Aldrich, Milwaukee, Wis.), deionized water (80 mL) and 5M HCl aqueous solution (20 mL). The mixture is stirred at room temperature until all solids are dissolved, then cooled to 0° C. A solution of sodium nitrite (3.2 g) is dissolved in deionized water (8 mL) and then is added dropwise into the solution of anthranilic acid at a rate that maintains the internal temperature range in the mixture of 0-5° C. Once diazotization is complete, the solution is stirred an additional 0.5 hr. Prior to coupling reaction, any excess nitrite ion is destroyed using aliquots of dilute aqueous urea solution. A second mixture for the coupling component is prepared by charging deionized water (100 mL) and sodium hydroxide (5.5 g) into a 500-mL vessel, stirring to dissolution, then adding 5-(acetoacetamido)-2-benzimidazolone (10.5 g, available from TCI America, Portland, Oreg.) into this solution while vigorously stirring until all solids dissolved. A separate solution containing glacial acetic acid (15 mL), 5M NaOH solution (30 mL) and deionized water (200 mL) is then added dropwise into the alkaline solution of coupling component while stirring vigorously, after which the coupling component is precipitated as a white suspension of particles, and the mixture is weakly acidic. For coupling reaction, the chilled diazotization mixture is slowly added dropwise into the suspension of coupling component, while stirring vigorously, to produce a reddish-yellow slurry of pigment. The slurry is stirred at room temperature for another 2 hours, after which time the pigment is isolated by vacuum-filtration, is washed with several volumes of deionized water (3 portions of 250 mL), then freeze-dried. Reddish-yellow granules of pigment are obtained, and TEM images show large aggregates of rod-shaped particles having high aspect ratio, with particle diameters ranging from 200 to 500 nm.

Example 1

Alkylated Benzimidazolone Stabilizer

A 100 mL single neck round bottom flask is charged with 0.709 g (0.0192 mol) of 2-decyltetradecanoic acid (ISO-CARB 24, obtained from Sasol America, Tex.) which is dissolved in 100 mL of THF with stirring under a nitrogen atmosphere. 6.8 mL (0.0779 mol) of oxalyl chloride (Sigma-Aldrich) is then added dropwise, followed with the dropwise addition of 0.30 µL of DMF. Visible evolution of HCl occurs, which subsides after about 30 min. The reaction is stirred for an additional 90 min., before the solvent is removed by rotary evaporation to afford a viscous, pale yellow oil. The product is then suspended in 100 mL of fresh THF under inert atmosphere, and is quantitatively transferred to a second flask containing 5-aminobenzimidazolone (2.93 g, 19.6 mmol) and triethylamine (4 mL, 28.7 mmol) dissolved in 20 mL of N-methylpyrrolidinone. The flask that contained the acid chloride product is rinsed with several portions of THF (50 mL) and is allowed to stir overnight. Deionized water is then added to quench any unreacted acid chloride and the mixture is poured into 300 mL of ethyl acetate and washed with three 100 mL portions of deionized water. The solvents are then removed from the organic layer by rotary evaporation until a white slurry is obtained, and the solids are collected by vacuum filtration, and washed with cold ethyl acetate to give 7.18 g (75% yield) of a white solid. The as product compound has the chemical structure

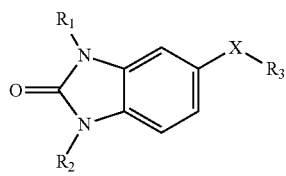

where X is

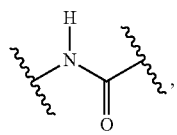

$R_1=R_2=H$, and $R_3=$

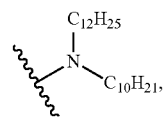

as confirmed by high-resolution NMR spectroscopy.

Example 2

Synthesis of Pigment Yellow 151 Nanoparticles using Alkylated Benzimidazolone Stabilizer Step I: Diazotization 1.81 g (13.2 mmol) of Anthranilic acid, 25 mL of deionized water, and 6.5 mL of 5 M hydrochloric acid are mixed with magnetic stirring while stirring in a 3-neck round bottom flask equipped with a thermometer. The clear solution is cooled to below 0° C. before 2.5 mL of ice cold aqueous 5.9 M $NaNO_2$ (14.6 mmol) is added at a rate to maintain an internal temperature below 0° C. The diazo solution is kept stirring cold for at least 30 min.

Step II: Preparation of Coupling Component Mixture 0.48 g (0.960 mmol) of 2-decyltetradecanamido-5-benzimidazolone (the stabilizer compound of Example 1) is dissolved in 12.5 mL of dimethyl sulfoxide and slowly added to 100 mL of deionized water with stirring. 52.5 mL of deionized water and 3 mL of 5 M NaOH are then added, followed by 3.07 g (5.23 mmol) of 5-acetoacetylamino-benzimidazolone (TCI America) dissolved in 7.5 mL of 5 M NaOH. 5.5 mL of glacial acetic acid is then added slowly below the surface of the liquid to give a fine suspension of white solid.

Step III: The Coupling Reaction

The cold diazo solution from Step (I) is added dropwise at room temperature to a vigorously stirred, weakly acidic suspension of the coupling component as prepared in Step (II), which produced a yellow pigment slurry. After stirring overnight, the solid is collected by suction filtration. The wetcake is reslurried in fresh water and collected by suction filtration two times before freeze-drying, which gave a free flowing, yellow powder (5.14 g). Electron microscopy analysis (SEM/STEM) of the sample shows aggregates of platelet particles with lengths ranging between 30 to 250 nm, with the majority less than about 100 nm Dynamic Light Scattering (DLS) analysis of a colloidal solution of the sample (n-BuOH, 0.01 mg/mL) gives an average effective hydrodynamic diameter ($D_{eff}$) of 139 nm (PDI=0.202).

Ink Example 1

Preparation of Solid Ink Formulation with Pigment Yellow 151 Nanoparticles

Into a Szegvari 01 attritor available from Union Process are charged 1800.0 g ⅛ inch diameter 440 C Grade 25 steel balls available from Hoover Precision Products, Inc. The following components are added together and melt-mixed at 120° C. in a 600 mL beaker: 41.46 g of a triamide wax (triamide described in U.S. Pat. No. 6,860,930), 27.64 g KE-100 resin commercially available from Arakawa Corporation and 66.9 g of OLOA 11000, available from Chevron Oronite Company LLC. After a homogeneous solution is obtained, the mixture is quantitatively transferred to the attritor vessel. To the attritor vessel are then slowly added 24 g of PY 151 nanoparticles from Example 2. The pigmented mixture is allowed to attrite overnight for 19 hours at 175 RPM upon which the resultant concentrate is subsequently discharged, separated from the steel balls in its molten state, and then allowed to freeze thus forming Concentrate #1. The following components are added together and melt-mixed at 120° C. in a 600 mL beaker to form Solution #1: 106.0 g of a distilled Polyethylene Wax from Baker Petrolite, 9.87 g of a triamide wax (triamide described in U.S. Pat. No. 6,860,930), 34.93 g S-180 commercially available from Crompton Corporation, 14.87 g KE-100 resin commercially available from Arakawa Corporation, 3.36 g urethane resin (as described in Example 4 of U.S. Pat. No. 6,309,453), and 0.45 g Naugard-445 (an antioxidant) available from Crompton Corporation. Into a 250 mL beaker is transferred 55.5 g of Concentrate #1 and allowed to melt in an oven at 120° C., then transferred to a hot plate equipped with an overhead stirrer and allowed to stir at low speed as Solution #1 is slowly added. Additional stirring continues at increased speed of 300 RPM for 2 hours where an ink is formed. The ink is then successfully filtered in a KST-47 filtration apparatus (available from Advantec MFS, Inc.) using a 1 micron filter.

Ink Example 2

Preparation of Solid Ink Formulation with Pigment Yellow 151 Nanoparticles

Into a Szegvari 01 attritor available from Union Process are charged 1800.0 g ⅛ inch diameter 440 C Grade 25 steel balls available from Hoover Precision Products, Inc. The following components are added together and melt-mixed at 120° C. in a 600 mL beaker: 59.86 g of a triamide wax (triamide described in U.S. Pat. No. 6,860,930), 39.91 g KE-100 resin commercially available from Arakawa Corporation and 36.23 g of LUBRIZOL 2153, available from Lubrizol Corporation. After a homogeneous solution is obtained, the mixture is quantitatively transferred to the attritor vessel. To the attritor vessel are then slowly added 24 g of PY 151 nanoparticles from Example 2. The pigmented mixture is allowed to attrite overnight for 19 hours at 175 RPM upon which the resultant concentrate is subsequently discharged, separated from the steel balls in its molten state, and then allowed to freeze thus forming Concentrate #2. The following components are added together and melt-mixed at 120° C. in a 600 mL beaker to form Solution #2: 111.85 g of a distilled Polyethylene Wax from Baker Petrolite, 4.82 g of a triamide wax (triamide described in U.S. Pat. No. 6,860,930), 36.85 g S-180 commercially available from Crompton Corporation, 11.96 g KE-100 resin commercially available from Arakawa Corporation, 3.55 g urethane resin (as described in Example 4 of U.S. Pat. No. 6,309,453), and 0.47 g Naugard-445 (an antioxidant) available from Crompton Corporation. Into a 250 mL beaker is transferred 55.5 g of Concentrate #2 and allowed to melt in an oven at 120° C., then transferred to a hot plate equipped with an overhead stirrer and allowed to stir at low speed to avoid splashing as Solution #2 is slowly added. Additional stirring continues at increased speed of 300 RPM for 2 hours where an ink is formed. The ink is then successfully filtered past a 1 micron filter in a KST-47 filtration apparatus available from Advantec MFS, Inc.

The inks from Ink Examples 1 and 2 are also successfully jetted in a Xerox Phaser 8860 solid inkjet printer with the resultant prints being reasonably uniform in image quality.

Preparation of Non-Polar Liquid Dispersions

To ascertain the pigment dispersability and thermal stability in a nonpolar liquid carrier, it is convenient to use Isopar V as the liquid carrier since it is an inert non-polar solvent with low vapor pressure and has a viscosity similar to many piezo inkjet inks, of about 15 centipoise at 25° C.

Comparative Example 2

Nonpolar Liquid Pigment Dispersion

A dispersion of a commercial C.T. Pigment Yellow 151 is made in the following manner. To a 30 mL bottle are added 0.42 g OLOA 11000 (available from Chevron Oronite Company LLC), 6.48 g Isopar V (available from Univar Canada Ltd), and allowed to stir to effect dissolution of the OLOA 11000. To this homogeneous solution are added 70.0 g of ⅛ inch diameter 440 C Grade 25 steel balls available from Hoover Precision Products, Inc. and 0.28 g of the C.I. Pigment Yellow 151 pigment (available from Clariant Corporation) and placed on a jar mill with the speed adjusted such that the bottle is rotating at about 90 RPM for 4 days where the temperature is approximately 25° C. After the dispersion is milled for 4 days, 1.5 g of the resultant dispersion is transferred to a 1 dram vial and allowed to remain in an oven at 120° C. where the dispersion's viscosity and thermal stability are qualitatively assessed. The low-viscosity dispersion shows only fair stability at 120° C. where slight settling of some of the pigment particles from the vehicle are apparent after heating 6 days at 120° C. and where gross settling of particles occur after heating 12 days at 120° C.

Example 3

Nonpolar Liquid Pigment Dispersion

Another dispersion is formed in the same manner as in Comparative Dispersion Example 2 above, except that the Pigment Yellow 151 nanoparticles made in Example 2 are used in place of the commercial C.I. Pigment Yellow 151 pigment (available from Clariant Corporation).

The fineness of dispersion, as exemplified by its ability to wet and de-wet on glass, is one indication of dispersion quality. Poor wetting of a fluid-based dispersion typically manifests itself as having poor film quality on a glass substrate, for example, showing an apparent graininess and discontinuous phases. Such systems contain at least a portion of undispersed and/or aggregated and agglomerated pigment particles. In contrast to that, excellent wetting of a fluid-based dispersion on a glass substrate, for example, is typified as having very high transparent film quality and therefore indicates that the vast majority of pigment particles are well dispersed. Dispersion stability over time and elevated temperature can also be qualitatively assessed and rated in the manner described above. Visual assessment of the quality of the Isopar V liquid nonpolar dispersions, as prepared in Dispersion Comparative Example 2 and Dispersion Examples 3, aged in glass vials at 120° C. were completed and summarized in Table 3.

TABLE 3

Qualitative assessment of wettability and stability of Isopar V based dispersions.

| Attribute | Initial Preparation | | After 15 days at 120° C. | |
|---|---|---|---|---|
| | Dispersion-Comparative Example 2 | Dispersion-Example 3 (prepared with Nanopigments of Example 2) | Dispersion Comp. Ex. 2 | Dispersion-Example 3 (prepared with Nanopigments of Example 2) |
| Wettability on Glass | Good, some haziness | Excellent | Fair, some large particles observed | Excellent |
| Film Residue on Glass | Partial | None | Partial | None |
| Settling of Particles Observed | No | No | Yes, observed at 13 days | No |

The small and more thermally stable particle size distributions from the prepared nonpolar liquid dispersions containing nanoscale PY 151 pigments of this invention, were compared to the nonpolar liquid dispersions prepared with the larger-sized commercial Pigment Yellow 151. The smaller and more thermally stable PY 151 particle size distributions observed from the nanoscale PY 151 pigments of this invention make them much more suitable for use in ink jet printing inks, including Piezo Ink Jet printing inks.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A sterically bulky stabilizer of the formula:

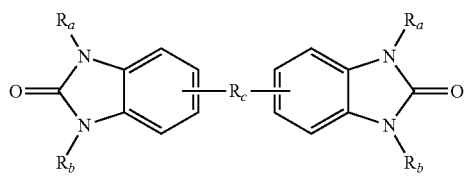

wherein each of $R_a$ and $R_b$ independently represent H or substituted or unsubstituted alkyl groups, provided that at least one of $R_a$ and $R_b$ on each benzimidazolone group represents H, and $R_c$ represents a group selected from the group consisting of:

—X—$(CH_2)_n$—X—; —[(XCH$_2$CH$_2$)$_n$]X—; —[(C=O)—(CH$_2$)$_n$—(C=O)]—; —X—[(C=O)—(CH$_2$)$_n$—(C=O)]—X—; —X—[(C=O)—X—(CH$_2$)$_n$—X—(C=O)]—X—; —[(C=O)—X—(CH$_2$)$_n$—X—(C=O)]—;

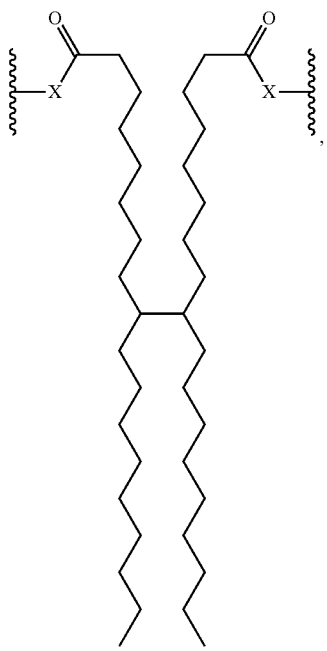

,

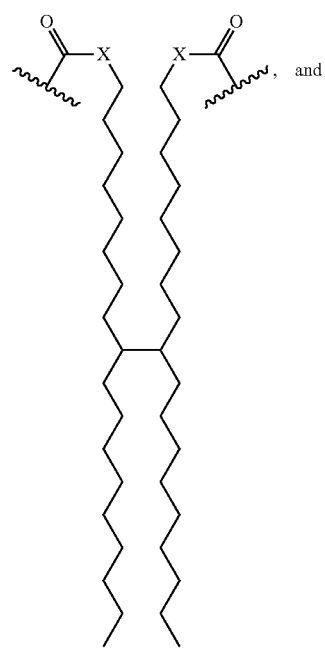

, and

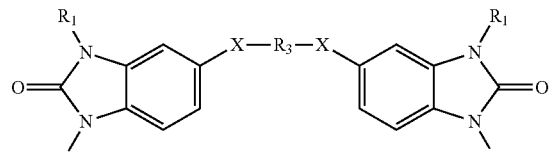
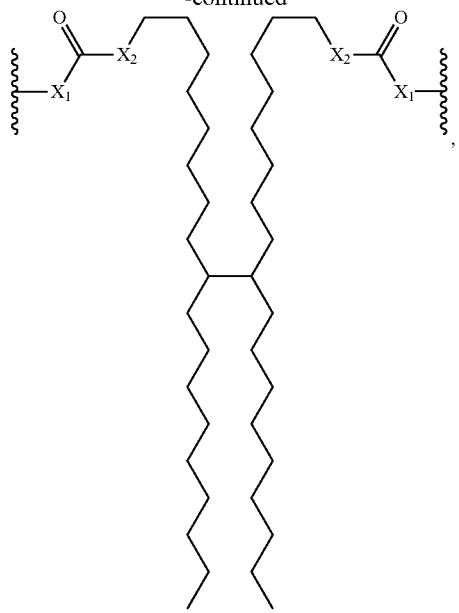
wherein X, $X_1$, and $X_2$ independently represent O, S, or NH, and n is an integer of 1 to 50.
2. The sterically bulky stabilizer of claim 1, wherein the sterically bulky stabilizer compound comprises an alkylated-benzimidazolone selected from the group consisting of the following compounds:
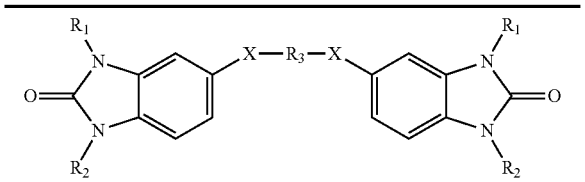
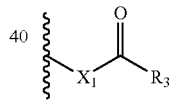
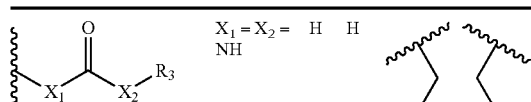

| Group X | R₁ R₂ R₃ |
|---|---|
| 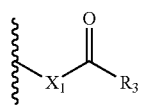 X₁ = O | H H 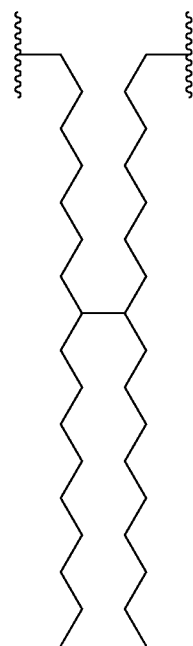 |
| 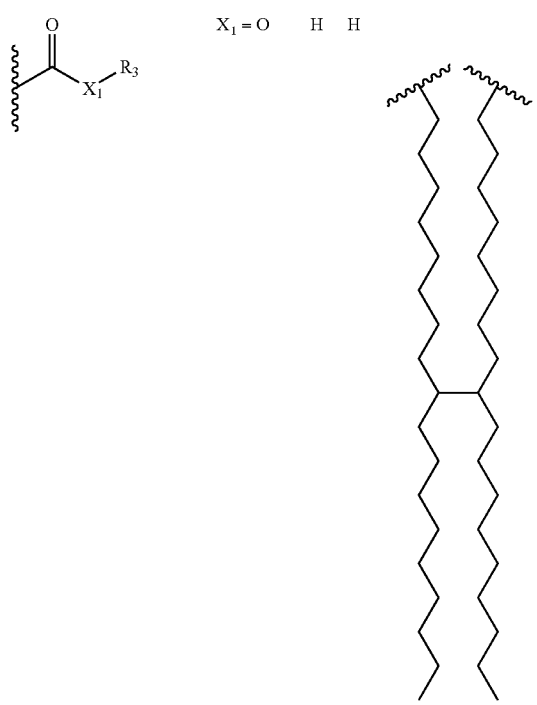 X₁ = O | H H |
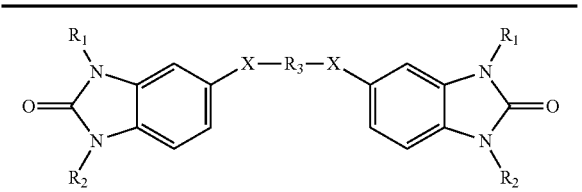
| Group X | R₁ R₂ R₃ |
|---|---|
| X₁ = NH | H H 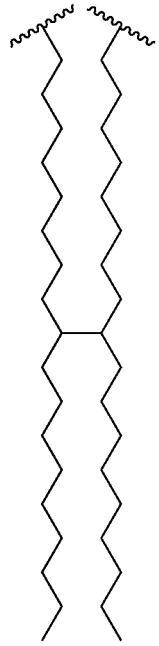 [SMILES: *CCCCCCCCC(CCCCCCCCC)C(CCCCCCCC*)CCCCCCCCC] |
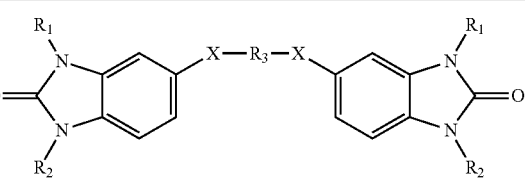
3. A sterically bulky stabilizer comprising an alkylated-benzimidazolone selected from the group consisting of the following compounds:

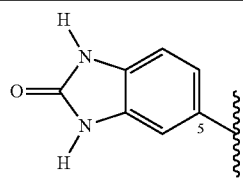

| Position 5 functional moiety | X | Sterically Bulky Group(s) | | |
|---|---|---|---|---|
| | | $R_1$ | $R_2$ | $R_3$ |
| ⸺X⸺C(O)⸺$R_1$ | NH | $(CH_2)_n CH_3$<br>n = 2, 11, 17 | — | — |
| ⸺X⸺C(O)⸺$R_1$ | NH | $(CH_2)_n CH_3$ / $(CH_2)_n CH_3$<br>m = 5, n = 3<br>m = 7, n = 5<br>m = 11, n = 9 | — | — |
| ⸺X⸺C(O)⸺$R_1$ | NH | (branched alkyl group) | — | — |
| ⸺X⸺C(O)⸺$R_1$ | NH | (branched alkyl group) | — | — |
| ⸺$X_1$⸺C(O)⸺$X_2$⸺$R_1$ | $X_1$ = $X_2$ = NH | $(CH_2)_n CH_3$<br>n = 11, 17 | — | — |
| ⸺$X_1$⸺C(O)⸺$X_2$⸺$R_1$ | $X_1$ = O<br>$X_2$ = NH | $(CH_2)_n CH_3$<br>n = 11, 17 | — | — |
| ⸺X($R_1$)($R_2$) | N | H | $(CH_2)_n CH_3$<br>n = 1, 17 | — |
| ⸺X($R_1$)($R_2$) | N | H | ⸺(CH($CH_3$)⸺O)$_n$⸺$(CH_2)_m CH_3$<br>m = 3, n = 2<br>m = 3, n = 3 | — |
| ⸺X($R_1$)($R_2$) | N | $(CH_2)_n CH_3$<br>n = 3, 11, 17 | $(CH_2)_n CH_3$<br>n = 3, 11, 17 | — |

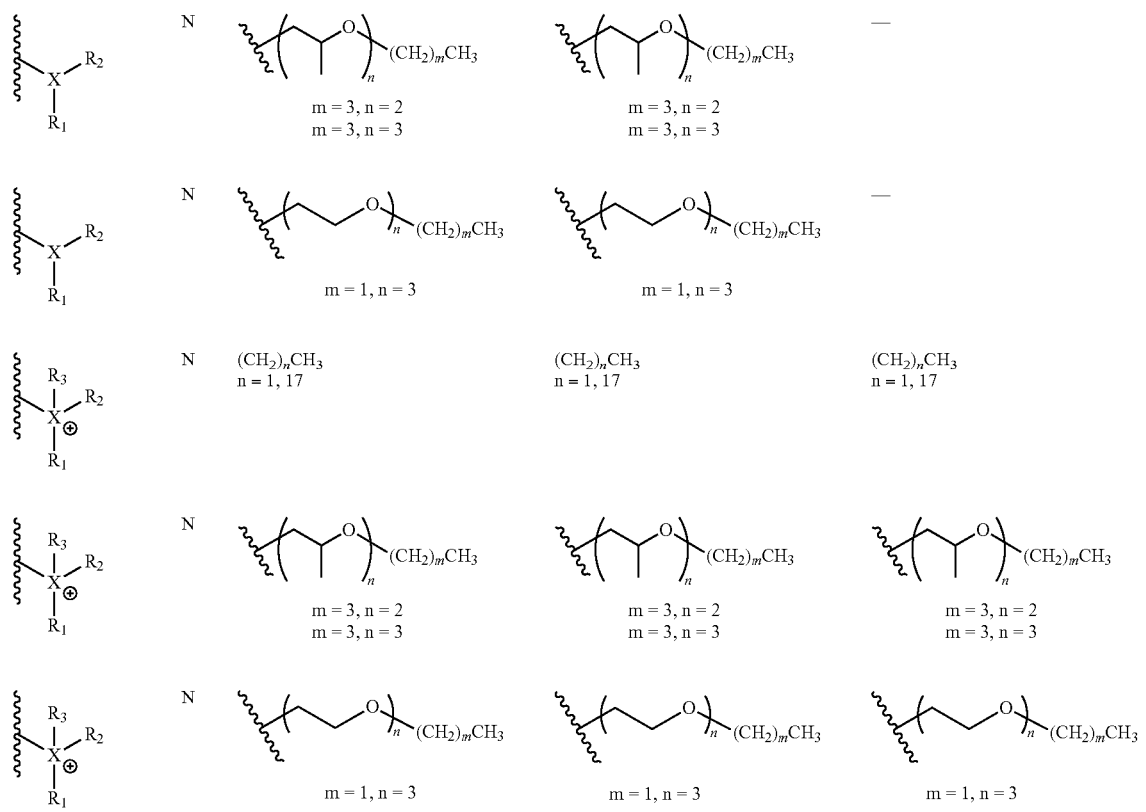
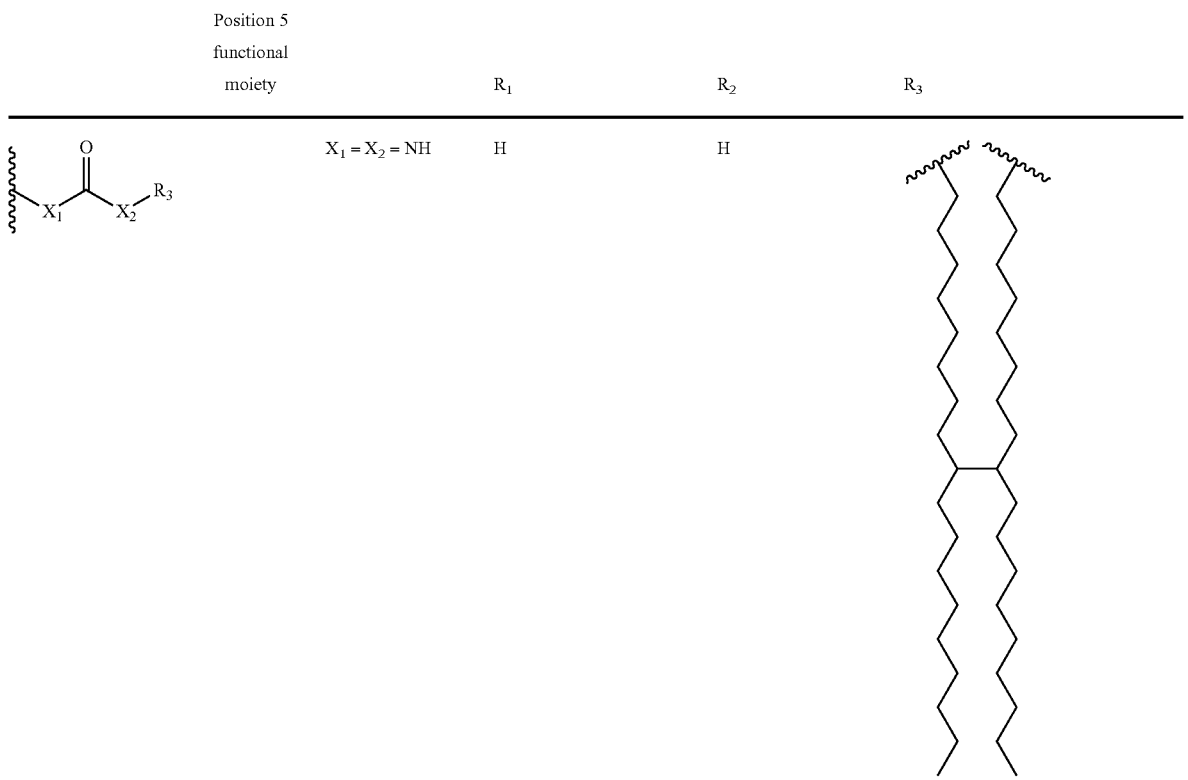

-continued
| | | | |
|---|---|---|---|
| 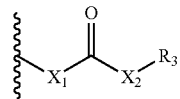 | $X_1 = O$<br>$X_2 = NH$ | H | H | 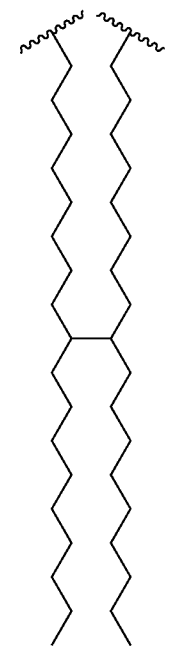 [SMILES: *CCCCCCCCC(CCCCCCCCC)C(CCCCCCCC*)CCCCCCCCC] |
| 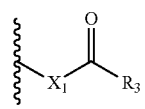 | $X_1 = NH$ | H | H | 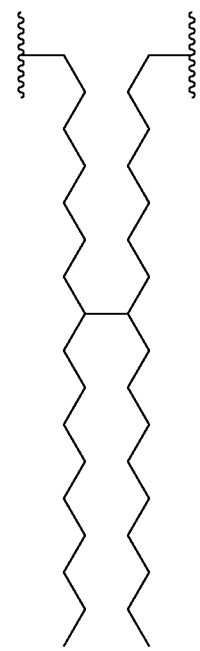 [SMILES: *CCCCCCCC(CCCCCCCCC)C(CCCCCCC*)CCCCCCCCC] |

-continued
| | $X_1$ = O | H | H |
|---|---|---|---|
| 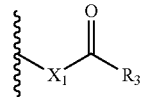 | | | 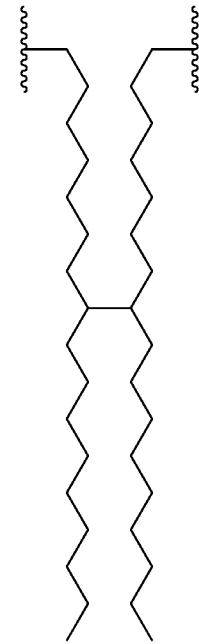 [SMILES: *CCCCCCCC(CCCCCCCCC)C(CCCCCCC*)CCCCCCCCC] |
| | $X_1$ = O | H | H |
| 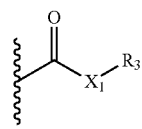 | | | 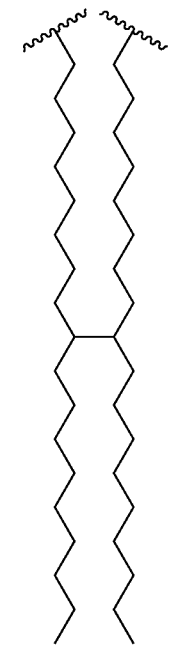 [SMILES: *CCCCCCCCC(CCCCCCCCC)C(CCCCCCCC*)CCCCCCCCC] |

-continued
| | | | | |
|---|---|---|---|---|
| 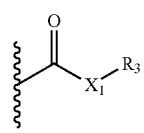 | $X_1$ = NH | H | H | 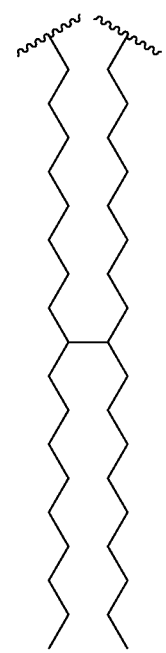 [SMILES: *CCCCCCCCC(CCCCCCCCC)C(CCCCCCCC*)CCCCCCCCC] and |
| 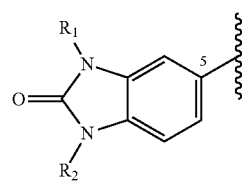 | | | | |
| 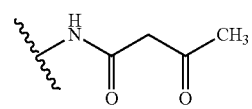 [SMILES: *NC(=O)CC(C)=O] | — | H | —(CH$_2$)$_n$CH$_3$<br>n = 1, 17 | — |
| 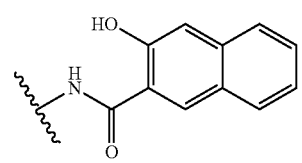 [SMILES: *NC(=O)c1cc2ccccc2cc1O] | — | —(CH$_2$)$_n$CH$_3$<br>n = 1, 17 | H | — |
| 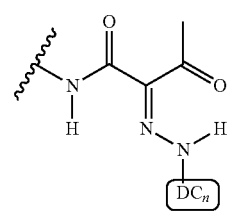 | — | H | H | — |
| 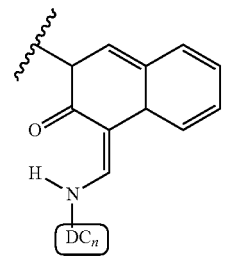 | — | H | H | — |

-continued
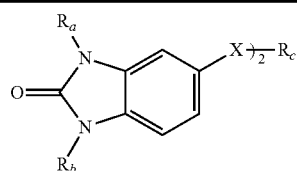
$R_a = R_b = H$
| Group X | $R_c$ |
|---|---|
| 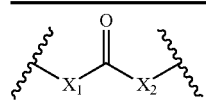 $X_1 = X_2 = NH$ | 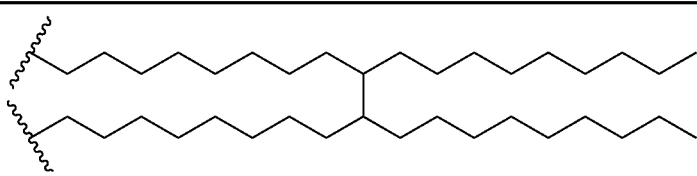 |
| 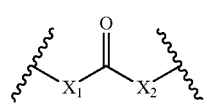 $X_1 = O$ $X_2 = NH$ | 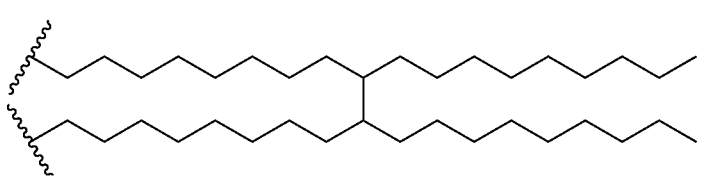 [SMILES: *CCCCCCCCC(CCCCCCCCC)C(CCCCCCCC*)CCCCCCCCC] |
| 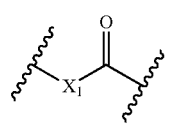 $X_1 = NH$ | 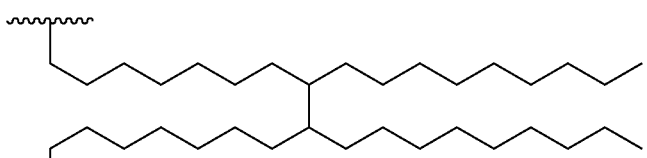 |
| 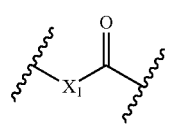 $X_1 = O$ | 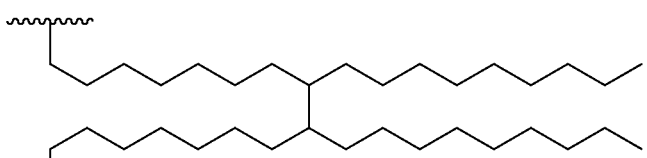 |
| 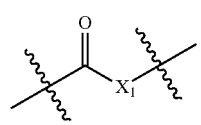 $X_1 = O$ | 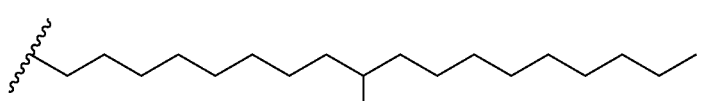 |
| 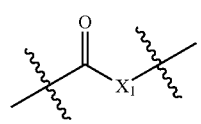 $X_1 = NH$ | 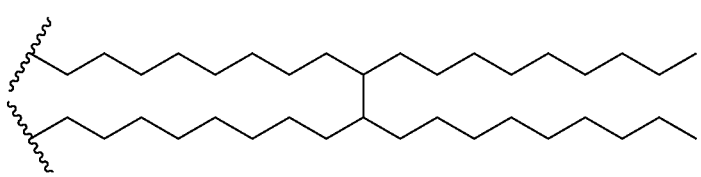 [SMILES: *CCCCCCCCC(CCCCCCCCC)C(CCCCCCCC*)CCCCCCCCC] |
wherein $DC_n$ represents a diazo moiety.
* * * * *